(12) United States Patent
Murugan et al.

(10) Patent No.: US 12,194,639 B2
(45) Date of Patent: Jan. 14, 2025

(54) DIGITAL REPRESENTATIONS OF ROBOT OPERATIONAL ENVIRONMENT, USEFUL IN MOTION PLANNING FOR ROBOTS

(71) Applicant: REALTIME ROBOTICS, INC., Boston, MA (US)

(72) Inventors: Aakash Murugan, Boston, MA (US); Jenni Lam, Boston, MA (US); Venkat K. Gopalakrishnan, Lexington, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 0 days.

(21) Appl. No.: 17/909,801

(22) PCT Filed: Mar. 16, 2021

(86) PCT No.: PCT/US2021/022600
§ 371 (c)(1),
(2) Date: Sep. 7, 2022

(87) PCT Pub. No.: WO2021/188566
PCT Pub. Date: Sep. 23, 2021

(65) Prior Publication Data
US 2024/0208060 A1    Jun. 27, 2024

Related U.S. Application Data

(60) Provisional application No. 62/991,487, filed on Mar. 18, 2020.

(51) Int. Cl.
*B25J 9/16*    (2006.01)

(52) U.S. Cl.
CPC ............. *B25J 9/1666* (2013.01); *B25J 9/161* (2013.01); *B25J 9/1697* (2013.01)

(58) Field of Classification Search
CPC ........ B25J 9/1666; B25J 9/161; B25J 9/1697; B25J 9/1664; G05B 2219/40442; G05B 2219/40492
(Continued)

(56) References Cited

U.S. PATENT DOCUMENTS

| 4,163,183 A | 7/1979 | Dunne et al. |
| 4,300,198 A | 11/1981 | Davini |

(Continued)

FOREIGN PATENT DOCUMENTS

| CA | 3071332 A1 * | 1/2019 | ............... B25J 9/162 |
| CN | 101837591 A | 9/2010 | |

(Continued)

OTHER PUBLICATIONS

Notice of Reasons for Rejection dated Feb. 16, 2023, for Japanese Application No. 2021-571340, 10 pages.

(Continued)

*Primary Examiner* — B M M Hannan
(74) *Attorney, Agent, or Firm* — Cozen O'Connor

(57) ABSTRACT

An oversized representation of at least a portion of a robot is filtered (e.g., voxels are set as unoccupied for any objects that reside completely within the oversized representation) from a representation of an operational environment, which provides a digital model of the operational environment which can, for example, be used for motion planning for the robot. The oversized representation exceeds a physical dimension of at least a portion (e.g. appendage) of the robot, to advantageously account for cables and other features that are attached to, and extending beyond, the outer dimensions of the robot. The specific dimensions of the oversized representation can be based on a variety of factors, for example a geometry of the cable, orientation or position of the robot appendage, orientation or position of the cable with (Continued)

respect to the robot appendage, velocity of the appendage, slack in the cable, etc., which may be modeled.

26 Claims, 5 Drawing Sheets

(58) Field of Classification Search
USPC ........................................................ 700/245
See application file for complete search history.

(56) References Cited

U.S. PATENT DOCUMENTS

| | | | |
|---|---|---|---|
| 4,763,276 A | 8/1988 | Perreirra et al. | |
| 4,862,373 A | 8/1989 | Meng | |
| 4,890,241 A | 12/1989 | Hoffman et al. | |
| 4,949,277 A | 8/1990 | Trovato et al. | |
| 5,177,563 A | 1/1993 | Everett et al. | |
| 5,297,238 A | 3/1994 | Wang et al. | |
| 5,347,459 A | 9/1994 | Greenspan et al. | |
| 5,544,282 A | 8/1996 | Chen et al. | |
| 5,727,132 A | 3/1998 | Arimatsu et al. | |
| 6,004,016 A | 12/1999 | Spector | |
| 6,049,756 A | 4/2000 | Libby | |
| 6,089,742 A | 7/2000 | Warmerdam et al. | |
| 6,259,988 B1 | 7/2001 | Galkowski et al. | |
| 6,345,213 B1 | 2/2002 | Graeser et al. | |
| 6,470,301 B1 | 10/2002 | Barral | |
| 6,493,607 B1 | 12/2002 | Bourne et al. | |
| 6,526,372 B1 | 2/2003 | Orschel et al. | |
| 6,526,373 B1 | 2/2003 | Barral | |
| 6,529,852 B2 | 3/2003 | Knoll et al. | |
| 6,539,294 B1 | 3/2003 | Kageyama | |
| 6,629,037 B1 | 9/2003 | Nyland | |
| 6,671,582 B1 | 12/2003 | Hanley | |
| 6,836,702 B1 | 12/2004 | Brogaardh et al. | |
| 6,907,133 B2 | 6/2005 | Gotoh | |
| 6,944,584 B1 | 9/2005 | Tenney et al. | |
| 7,493,231 B2 | 2/2009 | Graf | |
| 7,577,498 B2 | 8/2009 | Jennings et al. | |
| 7,609,020 B2 | 10/2009 | Kniss et al. | |
| 7,715,946 B2 | 5/2010 | Watanabe et al. | |
| 7,865,277 B1 | 1/2011 | Larson et al. | |
| 7,904,202 B2 | 3/2011 | Hoppe | |
| 7,940,023 B2 | 5/2011 | Kniss et al. | |
| 8,082,064 B2 | 12/2011 | Kay | |
| 8,103,085 B1 | 1/2012 | Zadeh | |
| 8,111,904 B2 | 2/2012 | Wallack et al. | |
| 8,162,584 B2 | 4/2012 | Michael et al. | |
| 8,315,738 B2 | 11/2012 | Chang et al. | |
| 8,571,706 B2 | 10/2013 | Zhang et al. | |
| 8,666,548 B2 | 3/2014 | Lim | |
| 8,825,207 B2 | 9/2014 | Kim et al. | |
| 8,825,208 B1 | 9/2014 | Benson | |
| 8,855,812 B2 | 10/2014 | Kapoor | |
| 8,880,216 B2 | 11/2014 | Izumi et al. | |
| 8,972,057 B1 | 3/2015 | Freeman et al. | |
| 8,989,897 B2 | 3/2015 | De Smet | |
| 9,061,421 B2 | 6/2015 | Trompeter | |
| 9,092,698 B2 | 7/2015 | Buehler et al. | |
| 9,102,055 B1 | 8/2015 | Konolige et al. | |
| 9,227,322 B2 | 1/2016 | Graca et al. | |
| 9,280,899 B2 | 3/2016 | Biess et al. | |
| 9,327,397 B1 | 5/2016 | Williams et al. | |
| 9,333,044 B2 | 5/2016 | Olson | |
| 9,434,072 B2 | 9/2016 | Buehler et al. | |
| 9,539,058 B2 | 1/2017 | Tsekos et al. | |
| 9,632,502 B1 | 4/2017 | Levinson et al. | |
| 9,645,577 B1 | 5/2017 | Frazzoli et al. | |
| 9,659,236 B2 | 5/2017 | Barker et al. | |
| 9,687,982 B1 | 6/2017 | Jules et al. | |
| 9,687,983 B1 | 6/2017 | Prats | |
| 9,701,015 B2 | 7/2017 | Buehler et al. | |
| 9,707,682 B1 | 7/2017 | Konolige et al. | |
| 9,731,724 B2 | 8/2017 | Yoon | |
| 9,981,382 B1 | 5/2018 | Strauss et al. | |
| 9,981,383 B1 | 5/2018 | Nagarajan | |
| 10,035,266 B1 | 7/2018 | Kroeger | |
| 10,099,372 B2 | 10/2018 | Vu et al. | |
| 10,124,488 B2 | 11/2018 | Lee et al. | |
| 10,131,053 B1 | 11/2018 | Sampedro et al. | |
| 10,300,605 B2 | 5/2019 | Sato | |
| 10,303,180 B1 | 5/2019 | Prats | |
| 10,430,641 B2 | 10/2019 | Gao | |
| 10,671,081 B1 | 6/2020 | Prats | |
| 10,688,664 B2 | 6/2020 | Kovacs | |
| 10,705,528 B2 | 7/2020 | Wierzynski et al. | |
| 10,723,024 B2 | 7/2020 | Konidaris et al. | |
| 10,782,694 B2 | 9/2020 | Zhang et al. | |
| 10,792,114 B2 | 10/2020 | Hashimoto et al. | |
| 10,959,795 B2 | 3/2021 | Hashimoto et al. | |
| 11,314,254 B2 | 4/2022 | Macias et al. | |
| 11,358,337 B2 | 6/2022 | Czinger et al. | |
| 11,407,117 B1 * | 8/2022 | Hickman | B25J 9/1697 |
| 11,623,494 B1 | 4/2023 | Arnicar et al. | |
| 11,751,948 B2 | 9/2023 | Gregerson et al. | |
| 2002/0013675 A1 | 1/2002 | Knoll et al. | |
| 2002/0074964 A1 | 6/2002 | Quaschner et al. | |
| 2003/0155881 A1 | 8/2003 | Hamann et al. | |
| 2004/0249509 A1 | 12/2004 | Rogers et al. | |
| 2005/0071048 A1 | 3/2005 | Watanabe et al. | |
| 2005/0216181 A1 | 9/2005 | Estkowski et al. | |
| 2006/0235610 A1 | 10/2006 | Ariyur et al. | |
| 2006/0241813 A1 | 10/2006 | Babu et al. | |
| 2006/0247852 A1 | 11/2006 | Kortge et al. | |
| 2007/0106422 A1 | 5/2007 | Jennings et al. | |
| 2007/0112700 A1 | 5/2007 | Den et al. | |
| 2007/0239315 A1 | 10/2007 | Sato et al. | |
| 2008/0012517 A1 | 1/2008 | Kniss et al. | |
| 2008/0125893 A1 | 5/2008 | Tilove et al. | |
| 2008/0186312 A1 | 8/2008 | Ahn et al. | |
| 2008/0234864 A1 | 9/2008 | Sugiura et al. | |
| 2009/0055024 A1 | 2/2009 | Kay | |
| 2009/0192710 A1 | 7/2009 | Eidehall et al. | |
| 2009/0234499 A1 | 9/2009 | Nielsen et al. | |
| 2009/0295323 A1 | 12/2009 | Papiernik et al. | |
| 2009/0326711 A1 | 12/2009 | Chang et al. | |
| 2009/0326876 A1 | 12/2009 | Miller | |
| 2010/0145516 A1 | 6/2010 | Cedoz et al. | |
| 2010/0235033 A1 | 9/2010 | Yamamoto et al. | |
| 2011/0036188 A1 | 2/2011 | Fujioka et al. | |
| 2011/0066282 A1 | 3/2011 | Bosscher et al. | |
| 2011/0153080 A1 | 6/2011 | Shapiro et al. | |
| 2011/0222995 A1 | 9/2011 | Irie et al. | |
| 2011/0264111 A1 | 10/2011 | Nowlin et al. | |
| 2012/0010772 A1 | 1/2012 | Pack et al. | |
| 2012/0053728 A1 | 3/2012 | Theodorus et al. | |
| 2012/0083964 A1 | 4/2012 | Montemerlo et al. | |
| 2012/0215351 A1 | 8/2012 | Mcgee et al. | |
| 2012/0297733 A1 | 11/2012 | Pierson et al. | |
| 2012/0323357 A1 | 12/2012 | Izumi et al. | |
| 2013/0076866 A1 | 3/2013 | Drinkard et al. | |
| 2013/0325244 A1 | 12/2013 | Wang et al. | |
| 2013/0346348 A1 | 12/2013 | Buehler et al. | |
| 2014/0012419 A1 | 1/2014 | Nakajima | |
| 2014/0025201 A1 | 1/2014 | Ryu et al. | |
| 2014/0025203 A1 | 1/2014 | Inazumi | |
| 2014/0058406 A1 | 2/2014 | Tsekos | |
| 2014/0067121 A1 | 3/2014 | Brooks et al. | |
| 2014/0079524 A1 | 3/2014 | Shimono et al. | |
| 2014/0121833 A1 | 5/2014 | Lee et al. | |
| 2014/0121837 A1 | 5/2014 | Hashiguchi et al. | |
| 2014/0147240 A1 | 5/2014 | Noda et al. | |
| 2014/0156068 A1 | 6/2014 | Graca et al. | |
| 2014/0249741 A1 | 9/2014 | Levien et al. | |
| 2014/0251702 A1 | 9/2014 | Berger et al. | |
| 2014/0277718 A1 | 9/2014 | Izhikevich et al. | |
| 2014/0305227 A1 | 10/2014 | Johns | |
| 2014/0309916 A1 | 10/2014 | Bushnell | |
| 2014/0368504 A1 | 12/2014 | Chen et al. | |
| 2015/0005785 A1 | 1/2015 | Olson | |
| 2015/0037131 A1 | 2/2015 | Girtman et al. | |
| 2015/0051783 A1 | 2/2015 | Tamir et al. | |
| 2015/0134111 A1 | 5/2015 | Nakajima | |
| 2015/0217455 A1 | 8/2015 | Kikkeri et al. | |

(56) References Cited

U.S. PATENT DOCUMENTS

| | | |
|---|---|---|
| 2015/0261899 A1 | 9/2015 | Atohira et al. |
| 2015/0266182 A1 | 9/2015 | Strandberg |
| 2016/0001775 A1 | 1/2016 | Wilhelm et al. |
| 2016/0008078 A1 | 1/2016 | Azizian et al. |
| 2016/0016312 A1 | 1/2016 | Lawrence et al. |
| 2016/0059412 A1* | 3/2016 | Oleynik .............. B25J 19/02 |
| | | 700/250 |
| 2016/0107313 A1 | 4/2016 | Hoffmann et al. |
| 2016/0112694 A1 | 4/2016 | Nishi et al. |
| 2016/0121486 A1 | 5/2016 | Lipinski et al. |
| 2016/0121487 A1 | 5/2016 | Mohan et al. |
| 2016/0154408 A1 | 6/2016 | Eade et al. |
| 2016/0161257 A1 | 6/2016 | Simpson et al. |
| 2016/0299507 A1 | 10/2016 | Shah et al. |
| 2016/0324587 A1 | 11/2016 | Olson |
| 2016/0357187 A1 | 12/2016 | Ansari |
| 2017/0001775 A1 | 1/2017 | Cimmerer et al. |
| 2017/0004406 A1 | 1/2017 | Aghamohammadi |
| 2017/0028559 A1 | 2/2017 | Davidi et al. |
| 2017/0120448 A1 | 5/2017 | Lee et al. |
| 2017/0123419 A1 | 5/2017 | Levinson et al. |
| 2017/0132334 A1 | 5/2017 | Levinson et al. |
| 2017/0146999 A1 | 5/2017 | Cherepinsky et al. |
| 2017/0157769 A1 | 6/2017 | Aghamohammadi et al. |
| 2017/0168485 A1 | 6/2017 | Berntorp et al. |
| 2017/0168488 A1 | 6/2017 | Wierzynski et al. |
| 2017/0193830 A1 | 7/2017 | Fragoso et al. |
| 2017/0210008 A1 | 7/2017 | Maeda |
| 2017/0219353 A1 | 8/2017 | Alesiani |
| 2017/0252922 A1 | 9/2017 | Levine et al. |
| 2017/0252924 A1 | 9/2017 | Mjayanarasimhan et al. |
| 2017/0305015 A1 | 10/2017 | Krasny et al. |
| 2017/0315530 A1 | 11/2017 | Godau et al. |
| 2018/0001472 A1 | 1/2018 | Konidaris et al. |
| 2018/0001476 A1 | 1/2018 | Tan et al. |
| 2018/0029231 A1 | 2/2018 | Davis |
| 2018/0029233 A1 | 2/2018 | Lager |
| 2018/0032039 A1 | 2/2018 | Huynh et al. |
| 2018/0074505 A1 | 3/2018 | Lv et al. |
| 2018/0113468 A1 | 4/2018 | Russell |
| 2018/0136662 A1 | 5/2018 | Kim |
| 2018/0150077 A1 | 5/2018 | Danielson et al. |
| 2018/0172450 A1 | 6/2018 | Lalonde et al. |
| 2018/0173242 A1 | 6/2018 | Lalonde et al. |
| 2018/0189683 A1 | 7/2018 | Newman |
| 2018/0222050 A1 | 8/2018 | Vu et al. |
| 2018/0222051 A1 | 8/2018 | Vu et al. |
| 2018/0229368 A1 | 8/2018 | Leitner et al. |
| 2018/0281786 A1 | 10/2018 | Oyaizu et al. |
| 2018/0339456 A1 | 11/2018 | Czinger et al. |
| 2018/0349702 A1* | 12/2018 | Gildert .............. G06T 19/006 |
| 2019/0015981 A1 | 1/2019 | Yabushita et al. |
| 2019/0039242 A1 | 2/2019 | Fujii et al. |
| 2019/0087976 A1 | 3/2019 | Sugahara et al. |
| 2019/0101930 A1 | 4/2019 | Yadmellat |
| 2019/0105779 A1 | 4/2019 | Einav |
| 2019/0143518 A1 | 5/2019 | Maeda |
| 2019/0163191 A1 | 5/2019 | Sorin et al. |
| 2019/0164430 A1 | 5/2019 | Nix |
| 2019/0196480 A1 | 6/2019 | Taylor |
| 2019/0216555 A1 | 7/2019 | Dimaio et al. |
| 2019/0232496 A1 | 8/2019 | Graichen et al. |
| 2019/0234751 A1 | 8/2019 | Takhirov |
| 2019/0240835 A1 | 8/2019 | Sorin et al. |
| 2019/0262993 A1 | 8/2019 | Cole et al. |
| 2019/0291277 A1* | 9/2019 | Oleynik .............. B25J 9/1669 |
| 2019/0293443 A1 | 9/2019 | Kelly et al. |
| 2019/0391597 A1 | 12/2019 | Dupuis |
| 2020/0030971 A1* | 1/2020 | Oleynik .............. B25J 3/04 |
| 2020/0069134 A1 | 3/2020 | Ebrahimi Afrouzi et al. |
| 2020/0078097 A1 | 3/2020 | Gregerson et al. |
| 2020/0097014 A1 | 3/2020 | Wang |
| 2020/0215686 A1 | 7/2020 | Vijayanarasimhan et al. |
| 2020/0331146 A1 | 10/2020 | Vu et al. |
| 2020/0331155 A1 | 10/2020 | Vu et al. |
| 2020/0338730 A1 | 10/2020 | Yamauchi et al. |
| 2020/0338733 A1 | 10/2020 | Dupuis et al. |
| 2020/0353917 A1 | 11/2020 | Leitermann et al. |
| 2020/0368910 A1 | 11/2020 | Chu et al. |
| 2021/0009351 A1 | 1/2021 | Beinhofer et al. |
| 2021/0178591 A1* | 6/2021 | Floyd-Jones ......... B25J 9/1671 |
| 2022/0305648 A1* | 9/2022 | Oleynik .............. B25J 19/02 |
| 2022/0339875 A1 | 10/2022 | Czinger et al. |
| 2023/0031545 A1* | 2/2023 | Oleynik .............. G05B 19/42 |
| 2023/0063205 A1 | 3/2023 | Nerkar |
| 2023/0363833 A1 | 11/2023 | Gregerson et al. |

FOREIGN PATENT DOCUMENTS

| | | |
|---|---|---|
| CN | 102814813 A | 12/2012 |
| CN | 103722565 A | 4/2014 |
| CN | 104407616 A | 3/2015 |
| CN | 104858876 A | 8/2015 |
| CN | 102186638 B | 3/2016 |
| CN | 106660208 A | 5/2017 |
| CN | 107073710 A | 8/2017 |
| CN | 107206592 A | 9/2017 |
| CN | 107486858 A | 12/2017 |
| CN | 108297059 A | 7/2018 |
| CN | 108453702 A | 8/2018 |
| CN | 108789416 A | 11/2018 |
| CN | 108858183 A | 11/2018 |
| CN | 108942920 A | 12/2018 |
| CN | 109521763 A | 3/2019 |
| CN | 109782763 B | 11/2021 |
| CN | 114073585 A | 2/2022 |
| EP | 1241628 A2 | 9/2002 |
| EP | 1901150 A1 | 3/2008 |
| EP | 2306153 A2 | 4/2011 |
| EP | 3250347 A1 | 12/2017 |
| EP | 3486612 A1 | 5/2019 |
| EP | 3725472 A1 | 10/2020 |
| JP | 07100755 | 4/1995 |
| JP | 1997212229 | 8/1997 |
| JP | 1148177 | 2/1999 |
| JP | 11296229 | 10/1999 |
| JP | 2001166806 A | 6/2001 |
| JP | 2002073130 A | 3/2002 |
| JP | 2003127077 A | 5/2003 |
| JP | 2005022062 A | 1/2005 |
| JP | 2005032196 A | 2/2005 |
| JP | 2006224740 A | 8/2006 |
| JP | 2007257274 A | 10/2007 |
| JP | 2007531110 A | 11/2007 |
| JP | 2008502488 A | 1/2008 |
| JP | 2008065755 A | 3/2008 |
| JP | 2008134165 A | 6/2008 |
| JP | 2010061293 A | 3/2010 |
| JP | 2010210592 A | 9/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2016099257 A | 5/2016 |
| JP | 2017131973 A | 8/2017 |
| JP | 2017136677 A | 8/2017 |
| JP | 2017148908 A | 8/2017 |
| JP | 2018505788 A | 3/2018 |
| JP | 2018130793 A | 8/2018 |
| JP | 2018134703 A | 8/2018 |
| JP | 2018144158 A | 9/2018 |
| JP | 2018144166 A | 9/2018 |
| JP | 2019136848 A | 8/2019 |
| JP | 2019188530 A | 10/2019 |
| JP | 2020049623 | 4/2020 |
| JP | 2020082332 A | 6/2020 |
| KR | 19980024584 A | 7/1998 |
| KR | 20110026776 A | 3/2011 |

(56) References Cited

FOREIGN PATENT DOCUMENTS

| | | | | |
|---|---|---|---|---|
| KR | 20130112507 | A | 10/2013 | |
| KR | 20150126482 | A | 11/2015 | |
| KR | 20170018564 | A | 2/2017 | |
| KR | 20170044987 | A | 4/2017 | |
| KR | 20170050166 | A | 5/2017 | |
| KR | 20180125646 | A | 11/2018 | |
| TW | 201318793 | A | 5/2013 | |
| TW | 615691 | | 2/2018 | |
| TW | 653130 | | 3/2019 | |
| WO | 9924914 | A1 | 5/1999 | |
| WO | 2015113203 | A1 | 8/2015 | |
| WO | 2016122840 | A1 | 8/2016 | |
| WO | 2017168187 | A1 | 10/2017 | |
| WO | 2017214581 | A1 | 12/2017 | |
| WO | 2018043525 | A1 | 3/2018 | |
| WO | 2019183141 | A1 | 9/2019 | |
| WO | WO-2020040979 | A1 * | 2/2020 | ........... B25J 9/1666 |
| WO | 2020117958 | A1 | 6/2020 | |

OTHER PUBLICATIONS

Office Action issued in Taiwan Application No. 108104094, mailed Feb. 6, 2023, 24 pages.
Atay, Nuzhet, et al., "A Motion Planning Processor on Reconfigurable Hardware", All Computer Science and Engineering Research, Computer Science and Engineering; Report No. WUCSE-2005-46; Sep. 23, 2005.
Chen, Chao, Motion Planning for Nonholonomic Vehicles with Space Exploration Guided Heuristic Search, 2016, IEEE.com, Whole Document, 140 pages.
Corrales, J.A., et al., Safe Human-robot interaction based on dynamic sphere-swept line bounding volumes, Robotic and Computer-Integrated Manufacturing 27 (2011) 177-185, 9 page.
Hauck, Scott, et al., "Configuration Compression for the Xilinx XC6200 FPGA", IEEE Transactions on Computer-Aided Design of Integrated Circuits and Systems, vol. 18, No. 8; Aug. 1999.
Johnson, David E., et al., "Bound Coherence for Minimum Distance Computations", Proceedings of the 1999 IEEE International Conference on Robotics and Automation, May 1999.
Kavraki, L.E., et al., "Probabilistic Roadmaps for Path Planning in High-Dimensional Configuration Spaces", IEEE Transactions on Robotics and Automation, IEEE Inc .; vol. 12, No. 4, pp. 566-580; Aug. 1, 1996.
Pan, Jia, et al., Efficient Configuration Space Construction and Optimization for Motion Planning, 2015, Research Robotics, Whole Document, 12 pages.
Stilman, Mike, et al., "Manipulation Planning Among Movable Obstacles", Proceedings of the IEEE Int. Conf. on Robotics and Automation, Apr. 2007.
Hassan, "Modeling and Stochastic Optimization of Complete Coverage under Uncertainties in Multi-Robot Base Placements," 2016, Intelligent Robots and Systems (IROS} (Year: 2016).
Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).
Hassan, et al., "Simultaneous area partitioning and allocation for complete coverage by multiple autonomous industrial robots," 2017, Autonomous Robots 41, pp. 1609-1628 (Year: 2017).
Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.
Kalawoun, "Motion planning of multi-robot system for airplane stripping." 2019, Universite Clermont Auvergne (Year: 2019).
Kapanoglu, et al., "A pattern-based genetic algorithm for multi-robot coverage path planning minimizing completion time," 2012, Journal of Intelligent Manufacturing 23, pp. 1035-1045 (Year: 2012).
Notice of Allowance for U.S. Appl. No. 17/153,662, mailed Dec. 6, 2022, 15 pages.
Pires, et al., "Robot Trajectory Planning Using Multi-objective Genetic Algorithm Optimization," 2004, Genetic and Evolutionary Computation—GECCO 2004, pp. 615-626 (Year: 2004).
Final Office Action for U.S. Appl. No. 17/506,364, mailed Aug. 25, 2023, 55 pages.
Non-Final Office Action Issued in U.S. Appl. No. 17/270,597, mailed Aug. 18, 2023, 25 pages.
Office Action, ROC (Taiwan) Pat. Appln. No. 108130161 and Search Report—APP.108130161—mailed Sep. 19, 2023.
Bharathi Akilan et al: "Feed-rate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.
Communication Pursuant to Article 94(3) EPC, issued in European Application No. 17811131.6, Mailed Date: Jun. 16, 2020, 5 pages.
Communication Pursuant to Article 94(3) EPC, Issued in European Application No. 18209405.2, Mailed Date: Nov. 23, 2020, 4 pages.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
European Search Report dated Jul. 23, 2021, for European Application No. 19851097.6, 15 pages.
European Search Report issued in European Application No. 19771537.8, Mailed Date: Mar. 29, 2021, 8 pages.
European Search Report, Mailed Date: Nov. 17, 2020 for EP Application No. 16743821.7, 4 pages.
Extended EP Search Report mailed Jul. 18, 2022 EP App No. 20832308.9-1205, 10 pages.
Extended EP Search Report mailed Jul. 25, 2022 EP App No. 20857383.2-1205, 10 pages.
Extended European Search Report issued in European Application No. 17811131.6, Mailed Date: Apr. 24, 2019, 16 pages.
Extended European Search Report issued in European Application No. 18209405.2, Mailed Date: Aug. 2, 2019, 9 pages.
Extended European Search Report issued in European Application No. 19893874.8, Mailed Date: Jan. 5, 2022, 13 pages.
Extended European Search Report, Mailed Date: Apr. 10, 2018 for EP Application No. 16743821.7, in 9 pages.
Final Office Action Issued in U.S. Appl. No. 16/268,290, Mailed Date: Apr. 21, 2021, 58 pages.
Final Office Action mailed Aug. 2, 2021 for U.S. Appl. No. 16/240,086, 66 pages.
Final Office Action mailed Sep. 7, 2022, for U.S. Appl. No. 16/909,096, 54 pages.
First Office Action issued in Chinese No. 201680006941.3 with English translation, Mailed Date: Sep. 29, 2019, 16 pages.
Non-Final Office Action Issued in U.S. Appl. No. 16/268,290, Mailed Date: Jan. 27, 2021, 54 pages.
Murray, Sean, et al., "The microarchitecture of a real-time robot motion planning accelerator", 2016 49th Annual IEEE/ACM International Symposium on Microarchitecture (Micro), IEEE, Oct. 15, 2016, 12 pages.
Pobil, Angel P, et al., "A New Representation for Collision Avoidance and Detection", Proceedings of the 1992 IEEE, XP000300485, pp. 246-251.
Sato, Yuichi, et al., "Efficient Collision Detection using Fast Distance-Calculation Algorithms for Convex and Non-Convex Objects", Proceeding of the 1996 IEEE, XP-000750294, 8 pages.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
First Office Action issued in Chinese No. 201980024188.4 with English translation, Mailed Date: Feb. 22, 2023, 28 pages.
Non-Final Office Action Issued in U.S. Appl. No. 16/981,467, Mailed Mar. 16, 2023, 19 Pages.
Notice of Reasons for Rejection dated Feb. 7, 2023, for Japanese Application No. 2022-054900, 7 pages.
Communication Pursuant to Article 94(3) EPC, dated Jul. 12, 2023, for European Application No. 19 893 874.8-1205, 5 pages.

(56) References Cited

OTHER PUBLICATIONS

Final Office Action for U.S. Appl. No. 17/682,732, mailed Jul. 7, 2023, 46 pages.
First Office Action issued in Chinese No. 201980055188.0 with English translation, Mailed Date: Jul. 1, 2023, 16 pages.
First Office Action issued in Chinese No. 201980080759.6 with English translation, Mailed Date: Jun. 28, 2023, 4 pages.
First Office Action issued in Chinese No. 202080055382.1 with English translation, Mailed Date: Jun. 28, 2023, 30 pages.
International Search Report and Written Opinion for PCT/US2023/064012, mailed Jul. 10, 2023, 15 pages.
Extended EP Search Report mailed May 10, 2023, EP App No. 20818760.9-1012, 9 pages.
First Office Action and Search Report issued in Chinese No. 202080040382.4 with English translation, Mailed Date: May 26, 2023, 15 pages.
First Office Action issued in Chinese No. 202080059714.3 with English translation, Mailed Date: May 24, 2023, 24 pages.
Japanese Office Action, Japanese Application No. 2021-576425, Mar. 13, 2023, 14 pages.
Li, et al., "A Novel Cost Function for Decision-Making Strategies in Automotive Collision Avoidance Systems", 2018 IEEE, ICVES, 8 pages.
Non-Final Office Action Issued in U.S. Appl. No. 17/506,364, Mailed Apr. 28, 2023, 50 pages.
Schwesinger, "Motion Planning n Dynamic Environments with Application to Self-Driving Vehicles", Dr. Andreas Krause, Jan. 1, 2017, XP093029842.
Final Office Action Issued in U.S. Appl. No. 17/270,597, mailed Oct. 27, 2023, 29 pages.
Non-Final Office Action Issued in U.S. Appl. No. 17/604,285, mailed Nov. 21, 2023, 28 pages.
Notice of Reasons for Refusal dated Nov. 27, 2023, for Japanese Application No. 2021-561986, 10 pages.
Oleynikova, et al., "Singed Distance Fields: a Natural Representation for Both Mapping and Planning", 2016, 7 pages.
Taiwanese First Office Action—Application No. 109120779 dated Nov. 9, 2023, 11 pages.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Extended EP Search Report mailed Nov. 7, 2022, EP App No. 21744840.6-1205, 14 pages.
Klampfl Erica et al: "Optimization of workcell layouts in a mixed-model assembly line environment" International Journal of Flexible Manufacturing Systems, Kluwer Academic Publishers, Boston, vol. 17, No. 4, 23 pages., Oct. 10, 2006.
Long Tao et al: "Optimization on multi-robot workcell layout in vertical plane", Information and Automation (ICIA), 2011 IEEE International Conference on, IEEE, Jun. 6, 2011, 6 pages.
Pashkevich AP et al: "Multiobjective optimisation of robot location in a workcell using genetic algorithms", Control '98. UKACC International Conference on (Conf. Publ. No. 455) Swansea, Uk Sep. 1-4, 1998, London, UK, vol. 1, Sep. 1, 1998, 6 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
First Office Action issued in Japanese Patent Application No. 2017-557268, Mailed Date: Aug. 7, 2018, 15 pages.
Gasparetto A et al: "Experimental validation and comparative analysis of optimal time-jerk algorithms for trajectory planning", Robotics and Computer Integrated Manufacturing, Elsevier Science Publishers BV. , Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
International Search Report and Written Opinion for PCT/US2019/016700, Mailed Date: May 20, 2019, 14 pages,.
International Search Report and Written Opinion for PCT/US2019/023031, Mailed Date: Aug. 14, 2019 in 19 pages.
International Search Report and Written Opinion for PCT/US2019/064511, Mailed Date: Mar. 27, 2020, 10 pages.
International Search Report and Written Opinion for PCT/US2021/061427, mailed Apr. 29, 2022, 14 pages.
International Search Report and Written Opinion issued in PCT Application No. PCT/2020/034551, Mailed Date: Aug. 31, 2020, 18 pages.
International Search Report and Written Opinion issued in PCT Application No. PCT/US2016/012204; Mailed Date: Mar. 21, 2016, 10 pages.
International Search Report and Written Opinion issued in PCT Application No. PCT/US2017/036880; Mailed Date: Oct. 10, 2017, 15 pages.
International Search Report and Written Opinion issued in PCT Application No. PCT/US2019/045270; Mailed Date: Nov. 25, 2019, 11 pages.
International Search Report and Written Opinion issued in PCT/US2019/012209, Mailed Date: Apr. 25, 2019, 24 pages.
International Search Report and Written Opinion, mailed Apr. 22, 2021, for International Application No. PCT/US2021/013610, 9 pages.
International Search Report and Written Opinion, Mailed Date: Jul. 29, 2020, in PCT/US2020/028343, 11 pages,.
International Search Report and Written Opinion, Mailed Date: Nov. 23, 2020, for PCT/US2020/047429, 11 Pages.
International Search Report and Written Opinion, Mailed Date: Sep. 29, 2020 for PCT/US2020/039193, 9 pages.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Murray et al., "Robot Motion Planning on a Chip", Robotics: Science and Systems, Jan. 1, 2016, 9 pages.
Non Final Office Action for U.S. Appl. No. 16/883,376, mailed Sep. 27, 2022, 26 pages.
Non-Final Office Action Issued in U.S. Appl. No. 16/240,086, Mailed Date: Feb. 11, 2021, 79 pages.
Non-Final Office Action Issued in U.S. Appl. No. 16/268,290, Mailed Date: Jun. 17, 2021, 35 pages.
Non-Final Office Action Issued in U.S. Appl. No. 16/308,693, Mailed Date: Dec. 11, 2020, 17 pages.
Non-Final Office Action Issued in U.S. Appl. No. 16/308,693, Mailed Date: Jun. 1, 2020, 16 pages.
Non-Final Office Action Issued in U.S. Appl. No. 15/546,441, Mailed Sep. 17, 2019, 58 Pages.
Non-Final Office Action Issued in U.S. Appl. No. 16/308,693, Mailed May 14, 2021, 16 pages.
Non-Final Office Action Issued in U.S. Appl. No. 16/909,096 Mailed May 6, 2022, 49 pages.
Non-Final Office Action mailed Sep. 14, 2022, for U.S. Appl. No. 16/999,339, 18 pages.
Notice of Allowance mailed Sep. 23, 2021, for Ritchey, "Motion Planning for Autonomous Vehicles and Reconfigurable Motion Planning Processors," U.S. Appl. No. 16/615,493, 11 pages.
Notice of Allowance mailed Dec. 24, 2021, for Sorin, "Apparatus, Method and Article to Facilitate Motion Planning of an Autonomous Vehicle in an Environment Having Dynamic Objects," U.S. Appl. No. 16/240,086, 28 pages.
Notice of Allowance mailed Jan. 25, 2022, for Sorin, "Motion Planning for Autonomous Vehicles and Reconfigurable Motion Planning Processors ," U.S. Appl. No. 16/308,693, 18 pages.

(56) References Cited

OTHER PUBLICATIONS

Notice of Allowance mailed Sep. 24, 2021, for Ritchey, "Motion Planning of a Robot Storing a Discretized Environment on One or More Processors and Improved Operation of Same," U.S. Appl. No. 16/268,290, 8 pages.
Notice of Reasons for Rejection, issued in corresponding Japanese Application No. 2021-509212, dated Apr. 7, 2022, 6 pages (English Translation).
Notification of Transmittal of International Search Report and Written Opinion for International Application No. PCT/US2021/056317, mailed Feb. 11, 2022, 13 pages.
Office Action Issued in Japanese Application No. 2018-564836, Mailed Date: Dec. 3, 2019, 3 Pages.
Office Action Issued in Japanese Application No. 2018-564836, Mailed Date: May 19, 2020, 5 Pages.
Office Action Issued in Japanese Application No. 2021-171704, Mailed Date: Jan. 28, 2022, 3 Pages.
Office Action Issued in Japanese Application No. 2021-171726, Mailed Date: Jan. 26, 2022, 4 Pages.
or.pdf (Or | Definition of Or by Merriam-Webster, Sep. 9, 2019, https://www.merriam-webster.com/dictionary/or, pp. 1-12; Year: 2019.
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
Rodriguez et al., "Planning manipulation movements of a dual-arm system considering obstacle removing". Robotics and Autonomous Systems, Elsevier Science Publishers, vol. 62, No. 12, pp. 1816-1826; Aug. 1, 2014.
S. Saravana Perumaal et al: "Automated Trajectory Planner of Industrial Robot for Pick-and-Place Task", International Journal of Advanced Robotic Systems, vol. 10, No. 2, Jan. 1, 2013.
Second Office Action Issued in Japanese Patent Application No. 2017-557268, Mailed Date: Feb. 26, 2019, 5 pages.
Siciliano et al. "Robotics. Modelling, Planning and Control", Chapter 12: Motion Planning, pp. 523-559, 2009.
Sonja MacFarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Taiwanese First Office Action—Application No. 106119452 dated Jun. 18, 2021, 25 pages.
Notice of Reasons for Refusal for Japanese Patent Application No. 2022-562247, mailed Sep. 25, 2023, 7 pages.
Notice of Reasons for Refusal. Japanese Application No. 2022-556467, dated Sep. 28, 2023, 10 pages.
Christian Potthast et al: "Seeing with your hands: a Better way to obtain perception capablities with a personal robot", Advance Robotics and Its Social Impacts, Oct. 2, 2011, pp. 50-53. xp032235164.
Efrain Lopez-Damian et al: "Probabilistic view planner for 3D modelling indoor environments", Intelligent Robots and Systems, 2009. Oct. 10, 2009, pp. 4021-4026, xp031580735.
EP Search Report mailed Sep. 1, 2023, EP App No. 21789270.2-1205 /4135940 PCT/US2021026818—23 pages.
Kececi F et al:"Improving Visually Servoed Disassembly Operations by Automatic Camera Placement", Proceedings of The 1998 IEEE International Conference on Robotics and Automation. ICRA '98. May 16-20, 1998; New York, NY : IEEE, US ,XP000784527.
Notice of Reasons for Refusal for Japanese Patent Application No. 2021-571340, mailed Aug. 8, 2023, 8 pages.
Christian Frese et al : "Workspace monitoring and planning for safe mobile manipulaiton", Arxiv. Org, Cornell University Library, 201 Olin Library Cornell University Ithaca, NY 14853, Jun. 2, 2020 (Jun. 2, 2020), XP081690333. arXiv.2006.01546v1.
EP Search Report mailed Aug. 22, 2024, in EP App. No. 21887233. 1-1201/ 4196323 PCT/US2021056317 , 14 pages.
Magrini Emanuele et al: "Human-robot coexistence and interaction in open industrial cells", Robotics and Computer Integrated Manufacturing, Elsevier Science Publishers BV. Barking, GB, vol. 61, Aug. 5, 2019 (Aug. 5, 2019), xp08588002, ISSN: 0736-5845.
Notice of Reasons for Refusal. Japanese Application No. 2023-532462, dated Jun. 21, 2024, 25 pages.
Notice of Allowance for U.S. Appl. No. 18/221,027, mailed Jul. 1, 2024, 10 pages.
Notice of Allowance for U.S. Appl. No. 18/222,801, mailed Jul. 3, 2024, 9 pages.
Extended EP Search Report mailed Jan. 29, 2024, EP App No. 21772200.8-1205, 9 pages.
Japanese Decision of Registration for JP 2022-054900, mailed Jan. 9, 2024, 3 pages.
Office Action issued in Taiwan Application No. 109113033, mailed Jan. 19, 2024, 10 pages.
Office Action issued in Taiwan Application No. 109118558, mailed Jan. 4, 2024, 8 pages.
Communication Pursuant to Article 94(3) EPC, dated Apr. 30, 2024, for European Application No. 19851097.6-1201, 9 pages.
Hassan, Mahdi et al., "An Approach to Base Placement for Effective Collaboration of Multiple Autonomous Industrial Robots", 2015 IEEE International Conference on Robotics and Automation (ICRA), pp. 3286-3291.
Japanese Notice of Allowance for Application No. 2022-544106, mailed Apr. 30, 2024, 3 pages.
Lim, Zhen Yang et al., "Multi-objective hybrid algorithms for layout optimization in multi-robot cellular manufacturing systems", Knowledge-Based Systems, vol. 120, pp. 87-98.
Non-Final Office Action Issued in U.S. Appl. No. 18/221,027, mailed Feb. 29, 2024, 13 pages.
Non-Final Office Action Issued in U.S. Appl. No. 18/222,801, mailed Feb. 15, 2024, 44 pages.
Notice of Reasons for Refusal. Japanese Application No. 2023-524134, dated Mar. 12, 2024, 6 pages.

\* cited by examiner

DIGITAL REPRESENTATIONS OF ROBOT OPERATIONAL ENVIRONMENT, USEFUL IN MOTION PLANNING FOR ROBOTS

TECHNICAL FIELD

The present disclosure generally relates to digital representations of an operational environment in which one or more robots operate, and to robot motion planning employing digital representations of operational environments, for instance systems and methods that perform collision detection using the digital representations generated from sensor collected perception data to produce motion plans to drive robots and the like.

BACKGROUND

Description of the Related Art

Motion planning is a fundamental problem in robot control and robotics. A motion plan completely specifies a path a robot can follow from a starting state to a goal state, typically without colliding or with a reduced possibility of colliding with any obstacles in an operational environment, which is typically a three-dimensional operational environment. Challenges to motion planning include the ability to quickly perform motion planning even as characteristics of the three-dimensional operational environment change. For example, characteristics such as location or shape of one or more obstacles in the three-dimensional operational environment may change over time.

Typically, one or more sensors capture information about a three-dimensional operational environment in which one or more robots may operate. The three-dimensional operational environment may, for example, take the form of a work cell in which one or more robots operate. The robots may, for example, each have a respective moveable robotic appendage with an end effector or end of arm tool, and may interact with one or more workpieces. The captured sensor information is used to generate a digital representation or model of the three-dimensional operational environment, in which various portions of the three-dimensional environment are represented as being unoccupied or occupied by one or more objects that may reside in the three-dimensional operational environment. The objects may take the form of obstacles to be avoided, or targets to be interacted with by the robots. The digital representation may be employed to perform motion planning to generate a motion plan for driving the robots, while avoiding collisions with the various obstacles in the three-dimensional operational environment.

BRIEF SUMMARY

Robots may take a large variety of forms, often including a base, an appendage, and an end effector or end-of-arm tool located at a distal end of the appendage. The base may be fixed or moveable. The appendage is moveable with respect to the base, and may include one or more links coupled via one or more joints, with various actuators (e.g., electric motors, stepper motors, solenoids, electromagnets, piston and cylinders with associated valves and pressurized fluid reservoirs) coupled and operated to drive the links to rotate about the joints. The end effector may take any of a large variety of forms, for instance a gripper, a pair of opposable digits, a rotatory drill, screw or bolt driver, welding head, sensor, etc.

Often times, some structure may extend outwardly from a portion of a robot. For example, robots may be physically coupled to one or more cables, or may have one or more cables attached to various portions of the robot. For instance, one or more cables may extend between a base and an appendage of the robot. Additionally or alternatively, one or more cables may extend between various links of an appendage or between the appendage and the end effector. The cables may take a variety of forms. For example, one or more cables may be used to supply electrical power or to provide pressurized fluids (e.g., hydraulic, pneumatic) to one or more actuators. Also for example, one or more cables may be used to route communications signals, for instance routing communications signals from one or more robot mounted sensors (e.g., cameras, positional or rotary encoders, proximity sensors). The cables may be attached to the robot at various points or locations therealong, for example attached at several points along the appendage or along a link of the appendage, generally extending outwardly with respect to a perimeter of the appendage, the link, or other portion of the robot. In some instances, one or more portions of the cable(s) may droop, sag, or hang from a portion of the robot in at least in some positions and orientations of the robot. In some instances, one or more portions of the cables may change relative position or orientation with respect to the portion of the robot as the portion of the robot moves, for example as inertial forces act on the cable or portion thereof. Other structures (e.g., sensors, three-axis accelerometers) may also be attached to one or more portions of the robot, extending outwardly with respect to a perimeter of the appendage, the link, or other portion of the robot.

In generating a digital representation of a three-dimensional operational environment based on sensor or perception data, it may be advantageous to "filter" the robot itself out of the digital representation to prevent a given robot from blocking itself when performing motion planning. Thus, it may be advantageous to show a portion of the three-dimensional operational environment occupied by the robot as being unoccupied in the digital representation of the three-dimensional operational environment.

A volume occupied by a robot may be specified, for example, via a digital representation or model of the robot, which may take into account one or more joint positions of the robot at any given time. This digital representation or model may very accurately represent the outer dimensions of the robot, including the appendage and end effector This digital representation or model however fails to account for the various structures which may be attached to portions of the robot, for example failing to account for one or more cables that are attached to, and move with, one or more portions of the robot.

As described herein an oversized or "dilated" representation of at least a portion of a robot is filtered from a representation of a three-dimensional operational environment. The resulting "filtered" representation provides a digital model of the three-dimensional operational environment which can, for example, be used for motion planning for a given robot. The oversized representation exceeds one or more physical dimensions of at least a portion (e.g. appendage) of the robot, to advantageously account for cables and other features that are attached to the robot and potentially extend beyond the outer dimensions of the robot. The specific dimensions of the oversized representation can be based on a variety of factors, for example a geometry of the cable, orientation or position of the robot appendage, orientation or position of the cable with respect to the robot appendage, velocity of the appendage, slack, sag or tension in the cable, etc. Filtering the robot from the representation may, for example, include setting an occupancy value of one or more voxels as unoccupied for any objects that reside completely within the oversized representation of the robot or portion thereof. In this way, each robot in the three-dimensional operational environment and the structures (e.g., cables) attached thereto are filtered out of the digital representation of the three-dimensional operational environment, which can be used for motion planning for that same robot. Other robots, if any, in the three-dimensional operational environment constitute obstacles when motion planning for a given robot, thus are not filtered out of the digital representation used for motion planning for the given robot.

Thus, an oversized or "dilated" representation of at least a portion of a robot may be determined, that is selected or generated to be large enough to encompass the robot and associated structures (e.g., cables) extending from the robot or portion thereof. The amount of oversizing may, for example, be based on a set of heuristics, which may be determined during pre-runtime modeling.

In practice, any object representation that resides wholly inside a region that corresponds to the oversized or "dilated" representation may be indicated as being unoccupied, for example by changing an occupancy value of associated voxels from occupied to unoccupied. Any object representation that resides wholly outside the region or which straddles the region may be indicated as being occupied, for example by leaving an occupancy value of associated voxels as occupied.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
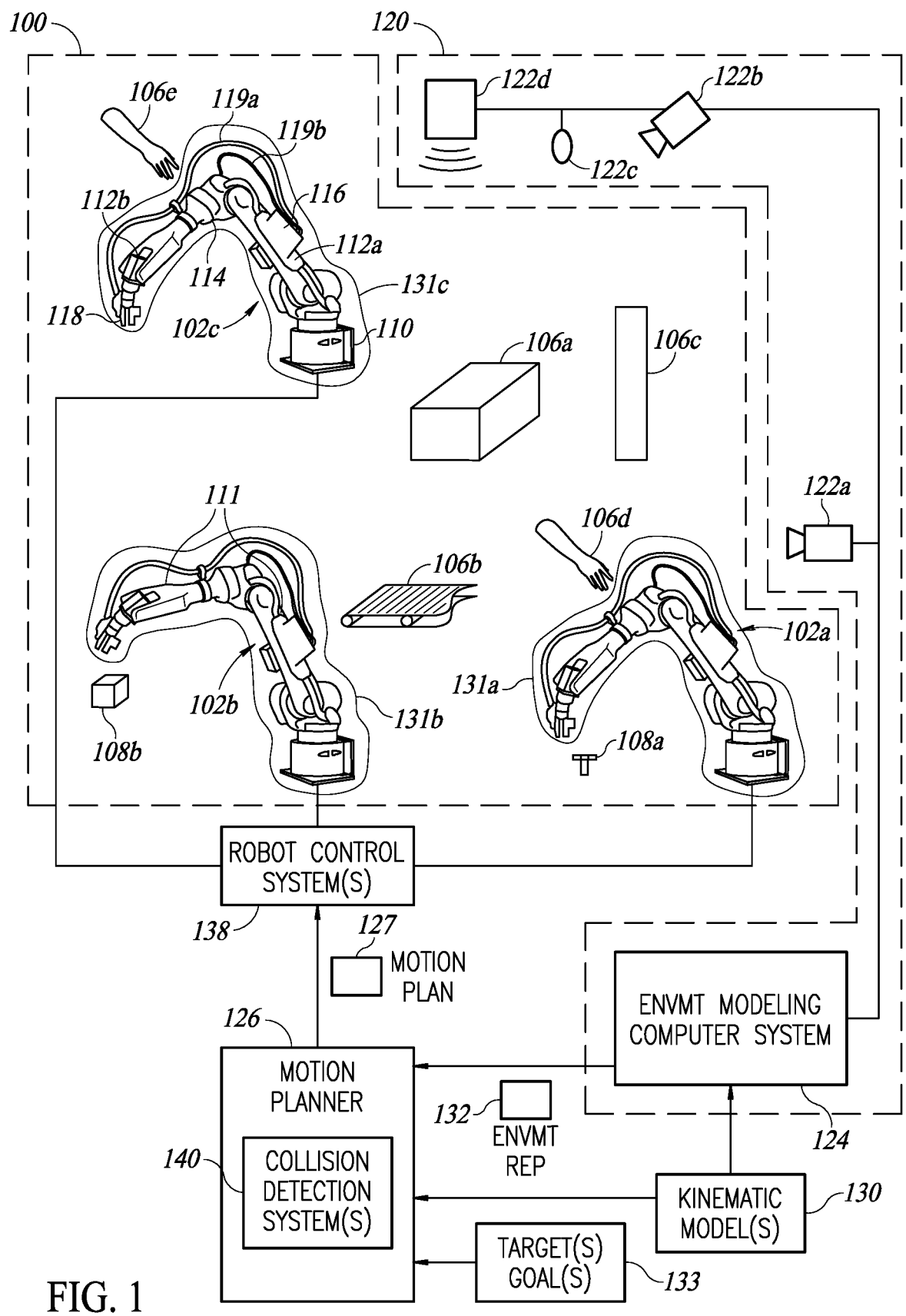
FIG. 1 is a schematic view of an operational environment in which one or more robots operate, an environmental modeling system comprising various sensors and an environment modeling computer system, and an optional motion planner and optional robot control system(s), according to one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one implementation embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms determine, determining and determined when used in the context of whether a collision will occur or result, mean that an assessment or prediction is made as to whether a given pose or movement between two poses via a number of intermediate poses will result in a collision between a portion of a robot and some object (e.g., another portion of the robot, a persistent obstacle, a transient obstacle, or some object other than a currently targeted object).

The headings and Abstract of the Disclosure provided herein are for convenience only and do not interpret the scope or meaning of the embodiments.

As an overview, an oversized representation of at least a portion of a robot is filtered (e.g., voxels are set as unoccupied for any objects that reside completely within the oversized representation) from a representation of an operational environment, which provides a digital model of the operational environment which can, for example, be used for motion planning for the robot. The oversized representation exceeds a physical dimension of at least a portion (e.g. appendage) of the robot, to advantageously account for structures (e.g., cables, cable ties, sensors, other features)

that are attached to, and extending beyond, the outer dimensions of the robot. The specific dimensions of the oversized representation can be based on a variety of factors, for example a geometry of the appended structure(s), orientation or position of the robot appendage, orientation or position of the appended structure(s) with respect to the robot appendage, velocity of the appendage, slack in the appended structure(s), etc., which may be modeled.

FIG. 1 shows a three-dimensional operational environment 100 in which one or more robots 102a, 102b, 102c (three shown, collectively 102) may operate, according to one illustrated embodiment. For the sake of brevity, the three-dimensional operational environment 100 is referred to herein as the environment 100. The environment 100 represents a three-dimensional space in which the robot(s) 102 may operate and move. It is noted that the environment 100 is different than a "configuration space" or "C-space" of any given robot 102.

The environment 100 can include obstacles 106a-106e (collectively 106) that represent regions of possible collision. The terms obstacle and obstacles 106 are used to indicate an object (e.g., inanimate objects including other robots, animate objects including people and other animals) which represents a risk of collision for a given robot 102.

Some of these obstacles 106a, 106b, 106c may take the form of static obstacles or objects (i.e., obstacles or objects that do not move (i.e., translate, rotate) or change shape during a relevant period or run time, e.g., buildings, trees, rocks, furniture, pedestals, support posts, shelves). Some of these obstacles may take the form of dynamic obstacles or objects 106d, 106e (i.e., obstacles or objects that move (i.e., translate, rotate) or change shape during at least a portion of a relevant period or run time, e.g., other robots, containers, vehicles or robots in the form of vehicles, people, animals, rolling or shifting items) in the environment 100. For example, a set of pedestals, walls, and a support post may be fixed or may not move or change shape over a relevant period of time (e.g., the run time), and hence are considered static obstacles. Also for example, a set of containers, workpieces, and another robot 102 may move or change shape (e.g., tilt) during a relevant period of time (e.g., the run time), and hence are considered dynamic obstacles.

Some obstacles 106a-106c occupy an area or volume that does not change over time, for example remaining fixed or unchanged during operation or movement of a robot. Such obstacles may thus be denominated as static or persistent obstacles. The area or volume occupied by static or persistent obstacles (e.g., obstacles 106a-106c) may be known at a time at which a model is determined or computational circuitry is configured, a time denominated as configuration time or pre-runtime.

For other obstacles 106d, 106e, a respective area or volume the obstacle occupies changes or is expected to change over time, for example changing during operation or movement of a robot. Such obstacles may thus be denominated as dynamic or transient obstacles. The area or volume occupied by dynamic or transient obstacles (e.g., obstacles 106d, 106e) is typically not known during configuration time, but rather is determined during robot operation or during a runtime.

The environment 100 may optionally include one or more target objects 108a 108b (two shown, collectively 108) with which the robots 102 are intended to interact, for example by grasping the target object 108, moving the target object 108, or otherwise engaging the target object 108 to perform some defined task or operation. The target object 108 is typically not considered an obstacle, but in some implementations could constitute an obstacle, for example where there are a plurality of target objects 108 which one robot 102a will engage sequentially or when considered with respect to another robot 102b, 102c which is not targeting the particular target object 108. Some implementations may not include any target object, the robot(s) 102 being moved between various poses without interacting with or engaging any objects.

FIG. 1 illustrates a representative environment 100 with a limited number of obstacles 106 and target objects 108. Typical environments may include many additional obstacles 106 and target objects 108, including objects that are other robots and various other natural or artificial static and dynamic obstacles 106 or target objects 108. Some environments 100 may completely omit target objects 108, or even omit dynamic obstacles 106d, 106e. The concepts taught herein may be employed in a similar fashion with a more populated environment than that illustrated.

The robot 102 may be any type of robot, including, but not limited to: Cartesian, selectively compliant arm for robotic assembly (SCARA), cylindrical, delta, polar and vertically articulated. The robot 102 may also be mobile, for instance in the form of an automobile, airplane, drone, or any other vehicle that can operate autonomously or semi-autonomously (i.e., at least partially autonomously) and move in the space represented by the environment 100.

In the illustrated implementation, the robot 102 includes a base 110 and an appendage 111 (only one called out) formed by a set of links 112a, 112b (only two called out, collectively 112), and a set of joints 114 (only one called out), each of the joints 114 physically coupling a respective pair of the links 112. The robot 102 can also include one or more actuators 116 (only one called out) that drive movement of one link 112a relative to another link 112b, or relative to the base 110. The actuators 116 may take any of a large variety of forms, for example, electric motors, stepper motors, solenoids, electromagnets, hydraulic pistons and cylinders, pneumatic pistons and cylinders, hydraulic valves, pneumatic valves, pumps or compressors for vacuum systems, hydraulic systems, pneumatic systems, including hydraulic and/or pneumatic reservoirs. The robot 102 may also include an end effector or end of arm tool 118, for example a grasper with opposable digits, hook, or vacuum port to physically engage target objects 108 in the environment 100.

Notably, the robot 102 may have one or more structures attached thereto, and which extend outwardly from the robot 102. In the illustrated example, the robot 102 includes a first cable 119a and a second cable 119b (only two cables shown, collectively 119). The one or more cables 119 may, for example, be attached to various portions of the robot 102. For instance, one or more cables 119 may extend between a base 110 and an appendage 111 (e.g., appendage formed by links 112 and joints 114) of the robot 102. Additionally or alternatively, one or more cables 119 may extend between various links 112 of an appendage 111 or between the appendage 111 and the end effector 118.

The cables 119 may take a variety of forms. For example, one or more cables 119 may be used to supply electrical power or provide pressurized fluids (e.g., hydraulic, pneumatic), for instance, to one or more actuators 116. For example, one or more cables 119 may be used to route communications signals, for instance from one or more robot mounted sensors (e.g., cameras, position or rotary encoders, proximity sensors, inertial sensors) or to one or more actuators 116.

The cables 119 may be attached to the robot 102 at various points or locations therealong, for example attached at several points along the appendage 111, generally extending outwardly with respect to a perimeter of the appendage 111 or other portion of the robot 102. In some instances, one or more portions of the cables 119 may droop, sag, or hang from a portion of the robot 102, at least in some positions and orientations of the robot 102. In some instances, one or more portions of the cables 119 may change relative position or orientation with respect to the portion of the robot 102 as the portion of the robot 102 moves, for example as inertial forces act on the cable 119 or portion thereof. Other structures (e.g., sensors, inertial sensors for instance three-axis accelerometers) may also be attached to one or more portions of the robot 102, generally extending outwardly therefrom.

An environmental modeling system 120 may comprise one or more environmental sensors 122a, 122b, 122c, 122d (four shown, collectively 122) and an environment modeling computer system 124.

The environmental sensors 122 can take any of a large variety of forms or types, for example one or more digital cameras 122a, 122b (e.g., time-of-flight digital cameras, 3D cameras), one or more motion sensors (e.g., passive-infrared motion sensors) or radars 122c, one or more LIDAR sensors 122d, one or more microphones (not shown), one or more weight sensors or load cells (not shown), one or more electric eyes (e.g., passive infrared (IR) sensors including IR light source and IR sensor) (not shown), one or more encoders (e.g., positon encoder, rotary encoder, Reed switch) (not shown), one or more temperature sensors (not shown), humidity sensors (not shown), and/or one or more pressure sensors (not shown), to name a few. The sensors 122 detect characteristics of the environment 100 including characteristics (e.g., position, orientation, shape, occupancy, movement, velocity) of the obstacles, target objects, the robots, and/or other objects in the environment 100. The sensors 122 can provide signals, wired, optically, wirelessly, to the environment modeling computer system 124 either directly, or via an intermediary processor-based system that collects and optionally pre-processes the collected sensor information. At least some of those signals may optionally encode or otherwise represent perception data.

The environment modeling computer system 124 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The environment modeling computer system 124 may be communicatively coupled (e.g., wired, optically, wirelessly) to one or more of the sensors 122 to receive sensed information, for instance perception data, either directly or indirectly. The environment modeling computer system 124 may optionally be communicatively coupled (e.g., wired, optically, wirelessly) to receive one or more models of the robots 102, for example one or more kinematic models 130 of the robots 102. The kinematic models 130 may, for example, take the form of hierarchical data structures. Hierarchical data structures may, for example, take the form of one or more types of trees. For instance, suitable hierarchical data structures may include octrees, trees of axis-aligned bounding boxes (AABBs), trees of oriented (not axis-aligned) bounding boxes, trees of spheres, and/or other tree type data structures.

The kinematic models 130 may, for example, take the form of non-hierarchical data structures (e.g., Euclidean Distance Field).

In some implementations, execution of the processor-executable instructions by one or more processors may cause the environment modeling computer system 124 to process or pre-process some or all of the received sensor information. As described herein, the environment modeling computer system 124 may generate one or more digital representations or models 132 of the three-dimensional operational environment 100, including any obstacles present in the environment 100 at a given period during the runtime. The digital representations or models 132 of the operational environment 100 may advantageously take the form of "filtered" digital representations or models 132. The digital representations or models 132 of the operational environment 100 may advantageously be used for motion planning for a given robot and in which regions occupied by an oversized representation 131a, 131b, 131c (three shown, collectively 131) of the given robot have been indicated as unoccupied, whereas other robots, if any, remain unfiltered from the digital representations or models 132 of the operational environment 100 that is generated for motion planning for the given robot. The digital representations or models 132 may take any of a large variety of forms, for example an occupancy grid.

One or more motion planners or motion planning systems 126 (only one illustrated) may be communicatively coupled (e.g., wired, optically, wirelessly) to the environment modeling computer system 124 to receive information therefrom and to generate motion plans based, at least in part, on the received information. Information may include the digital representations or models 132 (e.g., "filtered" digital representations or models 132) of the operational environment 100, including any obstacles (including other robots 102) present in the operational environment 100. Input to the motion planner or motion planning system 126 may also include a set of tasks, targets or goals 133 to be executed by each robot 102. Executing tasks typically employs motion planning, which in turn employs collision detection.

The motion planner or motion planning system 126 may be an integral part of the robot 102, separate and distinct from the robot 102, or one or more portions may be onboard the robot 102 while one or more other portions may be separate from (i.e., offboard) the robot 102. The motion planner or motion planning system 126 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The motion planner or motion planning system 126 may generate motion plans 127 for causing the robot 102 to carry out particular tasks, for example moving between a series of sequential poses, preferably without collisions with obstacles 106 or with a reduced probability of collisions. The motion planner or motion planning system 126 may be communicatively coupled (e.g., wired, optically, wirelessly) to one or more robot control systems 138 to provide instructions thereto that cause the particular robot 102 to follow or execute the motion plan.

The motion planner or motion planning system 126 may include or access a collision detection system 140. The collision detection system 140 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The collision detection system 140 advantageously employs the "filtered" digital representations or models 132, and optionally the kinematic model 130 of the robot (e.g., data structure representations of the kinematic model 130) to determine or detect or assess a probability of collision of a given robot with obstacles 106 in the environment 100 in various poses or in moving between poses. Those obstacles 106 can include other robots in the environment 100. The motion planner or motion planning system 126 and/or collision detection system 140 may, for example, take the form the motion planning system and collision detection system described in International (PCT) patent application PCT/US2019/045270, filed Aug. 6, 2019.

The robot control system 138 may include several components, which typically are distinct, but in some implementations may be combined in a common circuit board, processor or other circuitry. For example, a set of drivers may include circuitry communicatively coupled to actuator(s) 116 to drive the actuators 116 to cause the robot 102 to adopt or move to defined poses. Drivers can, for example, include motor controllers and similar circuitry that drive any one or more of electric motors, stepper motors, solenoids, electromagnets, hydraulic pistons, pneumatic pistons, hydraulic valves, pneumatic valves, pumps or compressors for vacuum systems, hydraulic systems, and/or pneumatic systems.

Figure 2:
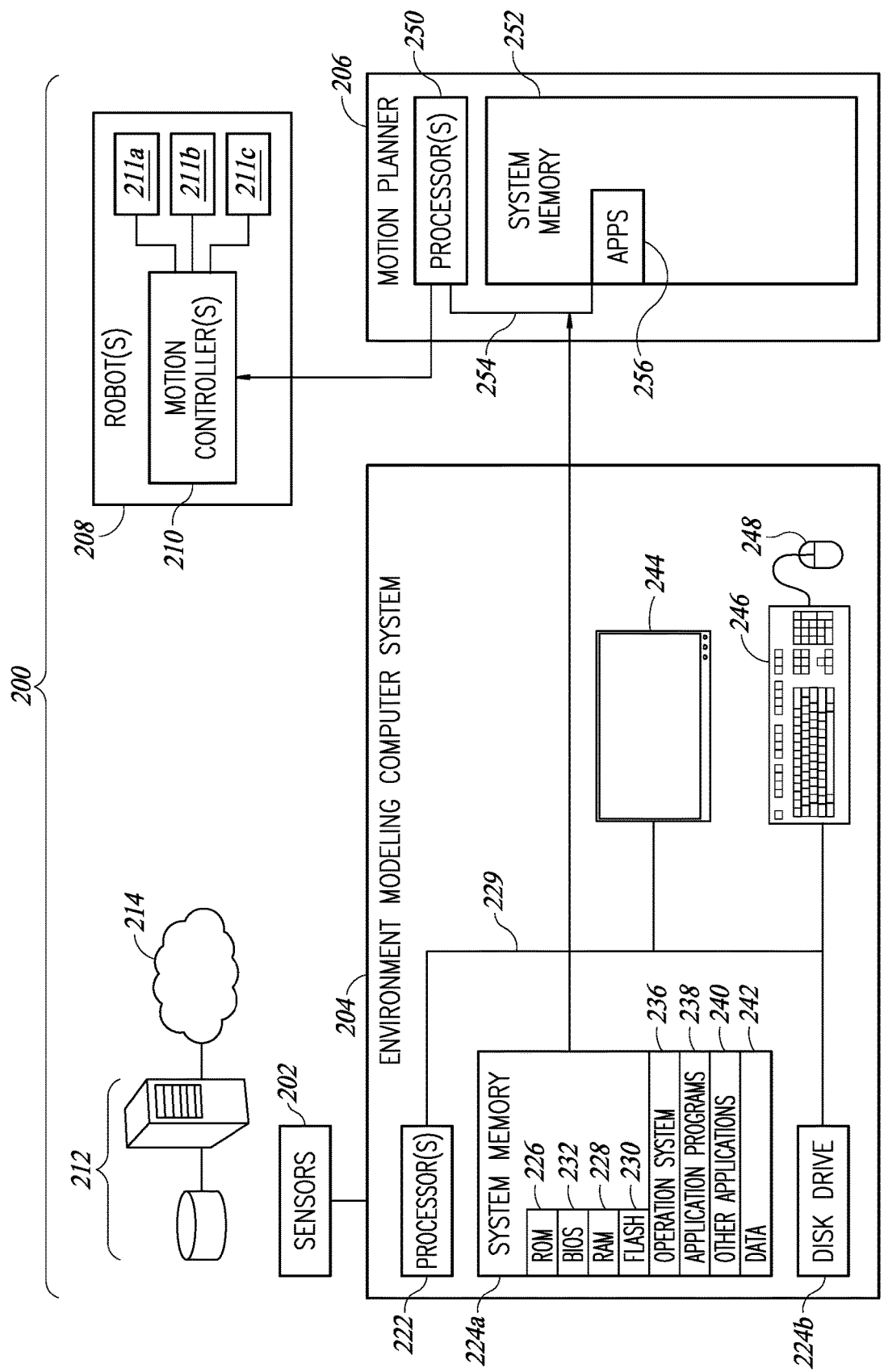
FIG. 2 is a functional block diagram of the environmental modeling system of FIG. 1, according to one illustrated implementation.

FIG. 2 shows a system 200, according to at least one illustrated implementation. The system 200 may include or implement various components or structures illustrated in and described with respect to FIG. 1.

The system 200 may include one or more sensors 202, one or more environment modeling computer systems 204, one or more motion planners 206, and one or more robots 208. The one or more environment modeling computer systems 204 may be communicatively coupled to the one or more sensors 202 to receive perception information or data therefrom. The one or more environment modeling computer systems 204 may be communicatively coupled to provide a digital representation or model of a three-dimensional operational environment. The digital representation or model of a three-dimensional operational environment may advantageously have a given robot filtered therefrom via an oversized representation 131 of the given robot to encompass structures (e.g., cables) that extend outwardly from the robot. The one or more motion planners 206 may be communicatively coupled to provide motion plans 127 (FIG. 1) to one or more robots 208 via one or more motion controllers 210.

As previous described, each robot 208 may include an appendage formed of a set of links and joints, with end-of-arm tools or end effectors at the end of the appendage, and/or may include one or more actuators 211a, 211b, 211c (three shown in FIG. 2, collectively 211) operable to move the links about the joints. Each robot 208 may include one or more motion controllers (e.g., motor controllers) 210 (only one shown) that receive control signals, for instance from the motion planner or motion planning system 206, and that provide drive signals to drive the actuators 211. The motion controllers 210 may be dedicated to controlling specific ones of the actuators 211.

An exemplary environment modeling computer system 204 will be described in detail for illustrative purposes. Those of skill in the art will recognize that the description is exemplary and variations may be made to the described and illustrated environment modeling computer system 204.

The environment modeling computer system 204 may comprise one or more processor(s) 222, and one or more associated non-transitory computer or processor-readable storage media, for example system memory 224a, disk drive(s) 224b, and/or memory or registers (not shown) of the processors 222. The non-transitory computer- or processor-readable storage media 224a, 224b are communicatively coupled to the processor(s) 222a via one or more communications channels, such as system bus 229. The system bus 229 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The environment modeling computer system 204 may also be communicably coupled to one or more remote computer systems 212, e.g., server computer, desktop computer, laptop computer, ultraportable computer, tablet computer, smartphone, wearable computer and/or sensors (not illustrated in FIG. 2), that are directly communicably coupled or indirectly communicably coupled to the various components of the environment modeling computer system 204, for example via a network interface (not shown). Remote computing systems (e.g., server computer) may be used to program, configure, control or otherwise interface with or provide input data (e.g., robot models) to the environment modeling computer system 204. Such a connection may be through one or more communications channels 214, for example, one or more wide area networks (WANs), for instance, Ethernet, or the Internet, using Internet protocols. In some implementations, pre-runtime or configuration time calculations (e.g., modeling of cables) may be performed by a system (e.g., computer system 212) that is separate from the environment modeling computer system 204. Runtime calculations may be performed by one or more environment modeling computer systems 204 and/or motion planners 206.

As noted, the environment modeling computer system 204 may include one or more processor(s) 222, (i.e., circuitry), non-transitory storage media 224a, 224b, and system bus 229 that couples various system components. The processors 222 may be any logic processing unit, such as one or more central processing units (CPUs), digital signal processors (DSPs), graphics processing units (GPUs), field programmable gate arrays (FPGAs), application-specific integrated circuits (ASICs), programmable logic controllers (PLCs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. The construction and operation of the various structures shown in FIG. 2 may implement or employ structures, techniques and algorithms described in or similar to those described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. patent application Ser. No. 62/865,431, filed Jun. 24, 2019, entitled "MOTION PLANNING FOR MULTIPLE ROBOTS IN SHARED WORKSPACE"; and/or International (PCT) patent application PCT/US2019/045270, filed Aug. 6, 2019.

The system memory 224a may include read-only memory ("ROM") 226, random access memory ("RAM") 228, FLASH memory 230, EEPROM (not shown). A basic input/output system ("BIOS") 232, which can form part of the ROM 226, contains basic routines that help transfer information between elements within the environment modeling computer system 204, such as during start-up.

The drive(s) 224b may be, for example, a hard disk drive for reading from and writing to a magnetic disk, a solid state (e.g., flash memory) drive for reading from and writing to solid state memory, and/or an optical disk drive for reading from and writing to removable optical disks. The environment modeling computer system 204 may also include any combination of such drives in various different embodiments. The drive(s) 224b may communicate with the processor(s) 222 via the system bus 229. The drive(s) 224b may include interfaces or controllers (not shown) coupled between such drives and the system bus 229, as is known by those skilled in the relevant art. The drive(s) 224b and associated computer-readable media provide nonvolatile storage of computer- or processor readable and/or executable instructions, data structures, program modules and other data for the environment modeling computer system 204. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Executable instructions and data can be stored in the system memory 224a, for example an operating system 236, one or more application programs 238, other programs or modules 240 and program data 242. Application programs 238 may include processor-executable instructions that cause the processor(s) 222 to perform one or more of: collecting or receiving sensor or perception data, receiving or generating a representation or model of a three-dimensional environment; receiving or generating an oversized representation 131 (FIG. 1) of a robot; identifying objects in the representation of the three-dimensional environment that reside wholly within a region that corresponds to the oversized representation 131 of the robot, setting an occupancy value for the regions occupied by the objects that reside wholly within the region that corresponds to the oversized representation 131 of the robot as being unoccupied, and providing the resulting "filtered" representation or model for use in further operations, for example in motion planning. Such operation can be executed as described herein (e.g., with reference to FIGS. 3 and 8) and in the references incorporated herein by reference. Application programs 238 may include one or more machine-readable and machine-executable instructions that cause the processor(s) 222 to perform other operations, for instance optionally handling perception data (captured via sensors). The processor-executable instructions cause the processor(s) 222 to construct "filtered" representations or models from the perception data, in which a volume that more than encompasses a region occupied by a given robot is indicated as being unoccupied. Application programs 238 may additionally include one or more machine-executable instructions that cause the processor(s) 222 to perform various other methods described herein and in the references incorporated herein by reference.

While shown in FIG. 2 as being stored in the system memory 224a, the operating system 236, application programs 238, other applications, programs/modules 240, and program data 242 can be stored on other non-transitory computer- or processor-readable media, for example drive(s) 224b.

Although not required, many of the implementations will be described in the general context of computer-executable instructions, such as program application modules, objects, or macros stored on computer- or processor-readable media and executed by one or more computers or processors. In various implementations, operations may be performed entirely in hardware circuitry or as software stored in a memory storage, such as system memory 224a, and executed by one or more hardware processors 222, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

The environment modeling computer system 204 may optionally include one or more input/output components, for example a monitor or touchscreen display 244, a keypad or keyboard 246, and/or pointing device such as a computer mouse 248.

Those skilled in the relevant art will appreciate that the illustrated implementations, as well as other implementations, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The implementations or embodiments or portions thereof (e.g., at configuration time and runtime) can be practiced in distributed computing environments where tasks or modules are performed by remote processing devices, which are linked through a communications network. In a distributed computing environment, program modules may be located in both local and remote memory storage devices or media. However, where and how certain types of information are stored may be important to help improve robot configuration.

The motion planner or motion planning system 206 may comprise one or more processor(s) 250, and one or more associated non-transitory computer or processor-readable storage media, for example system memory 252, disk drives (not shown), and/or registers (not shown) of the processors 250. The non-transitory computer- or processor-readable storage media (e.g., system memory 252) are communicatively coupled to the processor(s) 250 via one or more communications channels, such as system bus 254. The system bus 254 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®. One or more communications ports (not shown) can provide communications between the motion planner or motion planning system 206 and the environment modeling computer system 204 and/or the motion controllers 210. The motion planner or motion planning system 206 may optionally be communicatively coupled (e.g., wired, optically, wirelessly) to a computer or terminal (not shown) to allow for user input (e.g., indication of a motion subdivision granularity value or specification) and to provide user output.

The motion planner or motion planning system 206 may receive filtered representations or models of the environment in which an oversized representation 131 (FIG. 1) of a given robot has been indicated as unoccupied. The motion planner or motion planning system 206 may also receive robot models, tasks, target goals, limits on total number of robots, limit on tasks per robot, bounds or constraints on variables or other parameters, and/or limits on iterations.

The motion planner or motion planning system 206 executes processor-executable instructions (Apps 256) that causes the motion planner or motion planning system 206 to perform motion planning, typically relying on collision assessment to produce motion plans for the robots to perform tasks. The motion planner or motion planning system 206 may, for example, construct motion plans by performing collision detection or assessment, update costs of edges in motion planning graphs based on collision detection or assessment, and perform path search or evaluation. The motion planner or motion planning system 206 may, for example, generate populations of candidate solutions, model candidate solutions, produce or determine costs associated with respective candidate solutions based at least in part on the modeling, perform an optimization on the population of candidate solutions by an optimization engine that co-optimizes across a set of two or more non-homogenous parameters for two or more of: the respective base position and orientation of the robots, an allocation of the tasks to respective ones of the robots, and the respective target sequences for the robots; and/or providing output that can be used to position and orient robots in a multi-robot operational environment and cause the robots to perform tasks.

Figure 3:
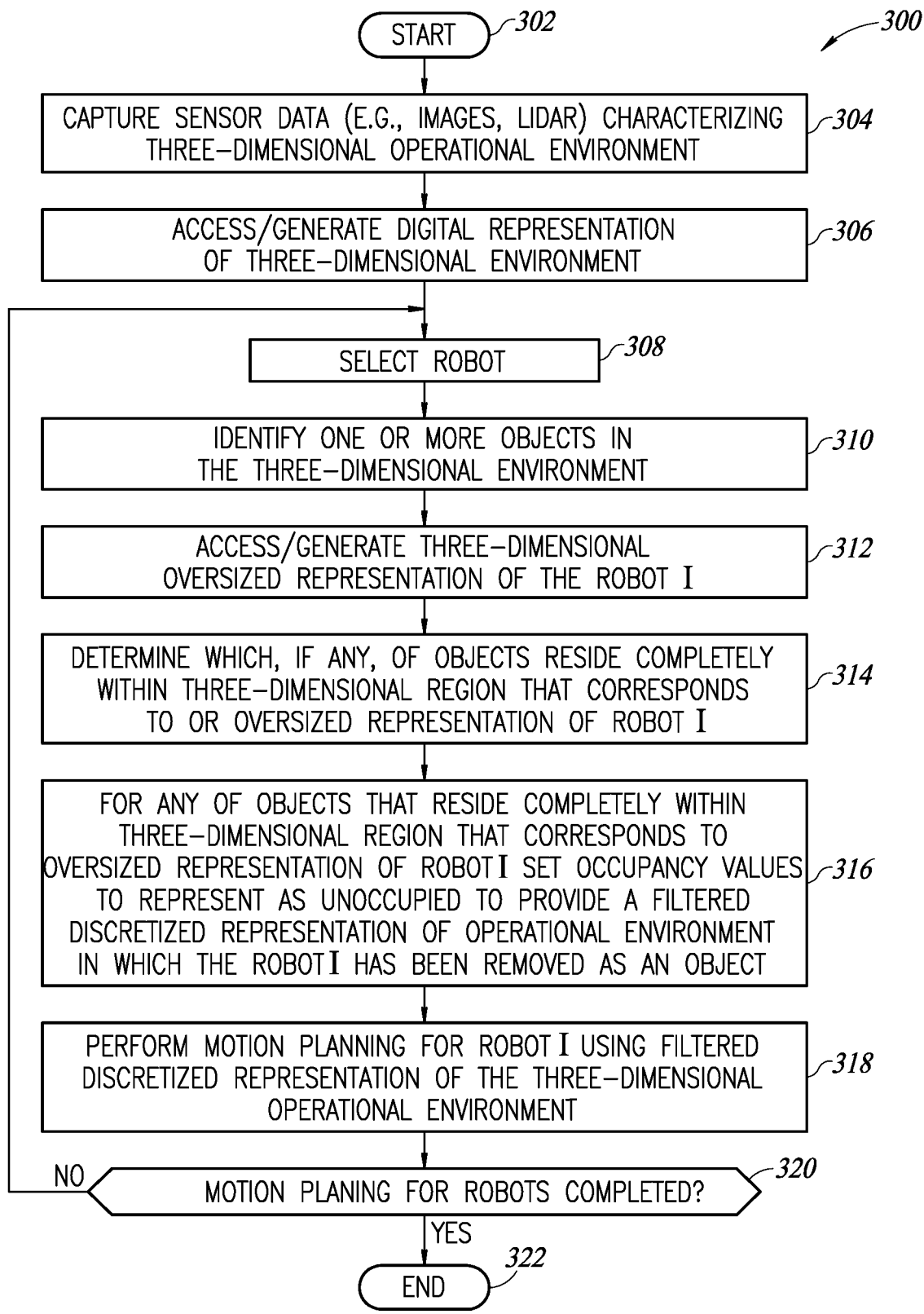
FIG. 3 is a flow diagram showing a high level method of operation of the environmental modeling system of FIG. 1, according to one illustrated implementation.

FIG. 3 shows a high level method 300 of operation of the environmental modeling system of FIG. 1, according to one illustrated implementation. The method 300 may be executed by one or more processor-based systems, for example by executing instructions stored on one or more nontransitory processor-readable media.

The method 300 is described with respect to an operational environment 100 (FIG. 1) where two or more robots 102a-102c (FIG. 1), 208 (FIG. 2) operate. Thus, the method 300 is illustrated as employing an iterative loop which generates representations or models of three-dimensional environments that allow motion planning to be performed sequentially for each of a total number of robots specified by an integer value N. While illustrated as being performed for robots 102a-102c in successive order, the particular order may be varied, and various implementations may operate on robots 102 in any desired order, including repeating for a single robot 102a multiple times before being performed for a different one of the robots 102b, 102c. In some implementations, one or more threads or instances of the method 300 may operate in parallel, for example a separate thread or instance operating concurrently for each of the robots 102a-102c in an operational environment 100.

The method 300 starts at 302, for example in response to a call via a calling routine or module, or in response to receipt of a signal or detection of an application of power to a computer system, for example an environment modeling computer system 124 (FIG. 1), 204 (FIG. 2).

At 304, one or more sensors 122, 202 capture sensor or perception data that characterizes a three-dimensional operational environment 100 (FIG. 1) in which one or more robots 102, 208 operate. The sensors 122, 202 can take a large variety of forms, for example one or more of: digital cameras, LIDAR sensors, microphones, weight sensors or load cells, electric eyes (e.g., IR light source and IR sensor), encoders (e.g., positon encoder, rotary encoder, Reed switch), temperature sensors, humidity sensors, and/or pressure sensors, to name a few. The sensor or perception data may be captured in any variety of forms as well as represented in any variety of forms, for instance as a point cloud or occupancy grid.

For example, the sensors 122, 202, may provide sensor or perception data and/or other sensed information to one or more processors. The sensor or perception data may be provided as a stream that represents which voxels or sub-volumes (e.g., boxes) are occupied in the environment at a current time, e.g., pre-configuration time, configuration time, run time). This sensor or perception data may be provided to one or more processors in the form of an occupancy grid. In particular, an object in the environment 100 (e.g., robot 102, obstacle 106, target object 108) may be represented by representing their respective surfaces as either voxels (3D pixels) or meshes of polygons (often triangles). Each discretized region of space is termed a "voxel," equivalent to a 3D (volumetric) pixel.

At 306, a processor-based system, for example the environment modeling computer system 124 (FIG. 1), 204 (FIG. 2), accesses and/or generates a digital representation or model of the three-dimensional environment 100 (FIG. 1) in which the robots 102 (FIG. 1) operate. For example, the environment modeling computer system 124, 204 may access a digital representation or model collected or assembled by a dedicated processor-based system that is communicatively located intermediate or between the sensors 122 (FIG. 1) and the environment modeling computer system 124, 204. Alternatively, the environment modeling computer system 124 may receive the sensor or perception information or data directly from the sensors 122 and generate the three-dimensional representation or model 132 (FIG. 1) of the operational environment.

Thus, at least one sensor 122, 202 may, in operation, capture one or more physical characteristics of the three-dimensional operational environment 100. At least one processor-based device generates a digital representation of the three-dimensional operational environment 100 from the captured one or more physical characteristics of the three-dimensional operational environment sensed by the at least one sensor 122, 202. For example, a processor-based device (e.g., computer system) may generate one or more of a point cloud, a voxel grid, a surface map, a mesh, an occupancy grid, or another type of data structure.

The three-dimensional operational environment 100 may be represented, for instance, as a plurality of voxels, where each voxel includes at least one respective occupancy value that represents an occupancy condition or state of the three-dimensional operational environment as at least one of occupied or unoccupied. In some implementations, the occupancy value is a Boolean value that indicates only two states, occupied or unoccupied. In other implementations, the occupancy value may represent three or more conditions, e.g., occupied, unoccupied, and unknown. In further implementations, the occupancy value may be an integer or real number value that, for example, represents a probability of occupancy for the respective location (e.g., voxel).

Additionally or alternative, in at least some implementations, the environment modeling computer system 124, 204 may transform the output of the sensors 122, 202. For example, the environment modeling computer system 124, 204 may transform the output of the sensors 122, 202, may combine the outputs of multiple sensors 122, and/or may use coarser voxels to represent the environment 100. In some cases, it may be advantageous to represent objects as boxes (rectangular prisms). Due to the fact that objects are not randomly shaped, there may be a significant amount of structure in how the voxels are organized. Thus, representing objects as boxes may require far fewer bits (i.e., may require just the x, y, z Cartesian coordinates for two opposite corners of the box) than a voxel based representation. Also, performing intersection tests for boxes is comparable in complexity to performing intersection tests for voxels.

At 308, a processor-based system, for example the environment modeling computer system 124, 204, selects a robot I, for which a "filtered" representation or model of the operational environment 100 will be generated, for example for use in motion planning for the robot I. In some implementations, there may be a single robot. In other implementations, there may include two or more robots which at least partially share or operate in the operational environment 100. Various heuristics may be employed in selecting a robot I. For example, the environment modeling computer system 124, 204 may select robots based on a respective priority assigned to particular tasks the respective robots are to perform. Alternatively, the environment modeling computer system 124, 204 may sequentially iterate through robots (e.g., robots 102a-102c). As explained herein, the method may repeat for various robots 102a-102c, in any desired order.

At 310, a processor-based system, for example the environment modeling computer system 124, 204 identifies one or more objects in the three-dimensional environment 100 as represented by the representation or model of the operational environment 100 from the sensor or perception information or data. The objects may represent a robot (e.g., robot 102a) for which the three-dimensional representation or model is to be used for motion planning, may represent one or more obstacles in the operational environment, including other robots (e.g., 102b, 102c), and/or may represent one or more targets 108 in the operational environment 100. For example, the environment modeling computer system 124, 204 identifies one or more elements in a digital representation of a three-dimensional operational environment 100 that represent one or more physical objects that reside in the three-dimensional operational environment 100.

At 312, a processor-based system, for example the environment modeling computer system 124, 204 accesses and/or generates a three-dimensional oversized representation or "dilated" model 131 (FIG. 1) of a current robot I.

At 314, a processor-based system, for example the environment modeling computer system 124, 204 determines which, if any, of the objects reside completely within a three-dimensional region that corresponds to the dilated model or oversized representation 131 of robot I. For example, the environment modeling computer system 124, 204 determines which, if any, of the physical objects represented in the digital representation of the three-dimensional operational environment 100 reside completely within a three-dimensional representation of an oversized volume 131, the oversized volume 131 which encompasses at least an appendage 111 (FIG. 1) of a first robot (e.g., 102a) where at least one portion of the oversized volume 131 extends beyond a corresponding peripheral dimension of at least the appendage 111 of the first robot (e.g., 102a) to encompass one or more cables 119 (FIG. 1) physically coupled to the appendage 111 of the first robot. For instance, the environment modeling computer system 124, 204 may identify one or more groups of voxels in the digital representation of the three-dimensional operational environment 100 that are contiguous and that each have a respective occupancy value that represents an occupied occupancy condition. For instance, an algorithm called Connected Components may be executed to group together connected voxels. Also for example, the environment modeling computer system 124, 204 may then determine, for each of the one or more groups of voxels in the digital representation of the three-dimensional operational environment that have been identified as representing a physical object, whether the group of voxels straddle a boundary of the three-dimensional representation of the oversized volume.

At 316, for any of the objects that reside completely within the three-dimensional region that corresponds to the dilated model or oversized representation 131 of the current robot I, a processor-based system, for example the environment modeling computer system 124, 204, sets occupancy values to represent the region as unoccupied, in order to provide a filtered discretized representation 132 (FIG. 1) of operational environment 100 in which the current robot I has been removed as an object. For example, for any of the physical objects that are determined to reside completely within the three-dimensional representation of the oversized volume 131, the environment modeling computer system 124, 204 sets one or more occupancy values in the digital representation of the three-dimensional operational environment 100 to represent a volume corresponding to the respective physical object as unoccupied to provide the filtered representation 132 of the three-dimensional operational environment 100 in which the oversized volume 131 encompassing at least the robotic appendage 111 and the at least one cable 119 is not indicated or represented as being an obstacle. For instance, for each voxel in the digital representation of the three-dimensional operational environment 100 that corresponds to any of the objects that reside completely within the three-dimensional representation of the oversized volume 131 as represented in the digital representation of the three-dimensional operational environment 100, the environment modeling computer system 124 may set a respective occupancy value of the respective voxel as representative of being unoccupied.

At 318, a processor-based system, for example a motion planner 126, performs motion planning for the current robot I using the filtered discretized representation 132 of the three dimensional operational environment 100.

A wide variety of algorithms may be used to preform motion planning. Each of these algorithms typically needs to be able to determine whether a given pose of a robot or a motion from one pose to another pose results in a collision, either with the robot itself or with obstacles in the environment.

Collision detection hardware, software and/or firmware described or incorporated by reference herein can determine or compute whether a single robot pose or a robot motion from one pose (e.g., a start pose) to another pose (e.g., an end pose) causes a robot to collide with either itself or with any obstacles in a current environment in which the robot operates. The environment may include obstacles, that is objects (e.g., inanimate objects, animate objects including people and other animals) that present a risk of collision. The environment may or may not include one or more target objects, that is objects with which the robot is to engage. For some of the obstacles, a respective volume occupied by the obstacles is known at a time at which a model or computational circuitry of a motion planner is configured, a time denominated as configuration time, and is expected to remain fixed or unchanged through robot operation, a time denominated as run time. These obstacles are denominated as persistent obstacles since a volume the obstacle(s) occupies is known during configuration time and is expected to stay fixed or unchanged through run time. For other obstacles, a respective volume the obstacle(s) occupy is not known at the configuration time, and is only determined at run time. These obstacles are denominated as transient obstacles since a volume the obstacle(s) occupy is not known during configuration time. A respective volume occupied by one or more of these transitory obstacles may be fixed or non-moving or non-changing over time and denominated as static obstacles. A respective volume occupied by one or more of these transitory obstacles may be moving or changing over time and denominated as dynamic obstacles.

The collision detection hardware, software and/or firmware described herein can be implemented as a subroutine or function which can be called or invoked by various different motion planning algorithms for instance probabilistic road map (PRM), rapidly exploring random tree (RRT), RRT*, bi-directional RRT, etc. algorithms. The collision detection hardware, software and/or firmware described herein can also be used to accelerate grasp planning by quickly evaluating many candidate grasp poses.

Various implementations described herein typically employ two or three configuration time inputs: i) a kinematic model of the robot; ii) a representation of persistent obstacles in the environment that at configuration time have a known volume that they occupy in the environment; and optionally iii) a motion subdivision granularity value or specification. The kinematic model of the robot includes constraints (e.g., a minimum and maximum angle of an elbow joint) on any of a number of joints of the robot, a transformation from each link of a robot to a respective parent link of the robot, an axis of each joint of the robot, and a specification of a geometry of each link of the robot.

Various implementations described herein typically employ two or three run time inputs: a) start pose; b) optionally an end pose if motion is being evaluated; and c) a representation of transient obstacles in the environment that at run time have a known volume that they occupy in the environment, and that at configuration time a volume that they occupy in the environment is not known. Transient obstacles may be static (i.e., fixed or not moving or not changing shape during a relevant or run time period) or dynamic (i.e., moving or changing shape during at least a portion of the relevant or run time period). For a robot with a number D degrees of freedom, a pose may be specified as a D-tuple, where each element of the tuple specifies a position or rotation of that degree of freedom (joint).

Implementing efficient hardware for collision detection can be realized via careful attention to the selection of data structures to represent objects, poses, and/or motions. Well-chosen data structures can advantageously reduce the amount of memory required for storage, the amount of hardware required for collision detection, the latency to perform collision detection, and power consumption.

At 320, a processor-based system, for example the environment modeling computer system 124, 204, determines whether the motion planning for the robots is complete. If the motion planning for the robots is not complete, control passes to 308, where the environment modeling computer system 124, 204 again selects a robot. In some instances, the environment modeling computer system 124, 204 may select the same robot as selected in the most immediately preceding iteration. In other instances, the environment modeling computer system 124, 204 may select a different robot than the robot selected in the most immediately preceding iteration.

If the motion planning for the robots is complete, control passes to 322 where the method 300 terminates, for example until called or invoked again. Alternatively, the method 300 may execute continuously, or, for example as multiple threads on a multi-threaded processor or on respective cores of a processor or on respective processors.

Figure 4:
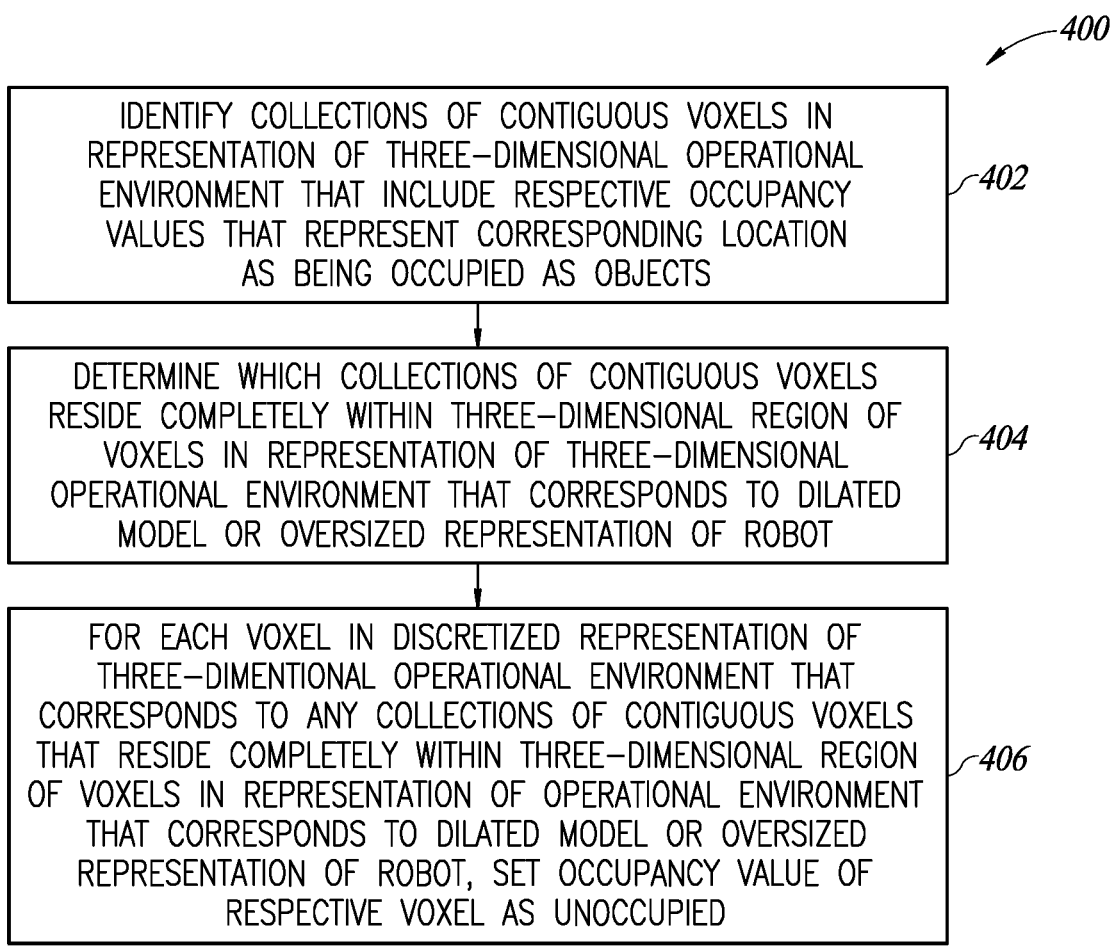
FIG. 4 is a flow diagram showing a low level method of operation of the environmental modeling system of FIG. 1, according to one illustrated implementation.

FIG. 4 shows a low level method 400 of operation of the environmental modeling system of FIG. 1, according to one illustrated implementation. The method 400 may be executed as part of execution of the method 300. While described in terms of voxels and voxel spaces, a similar method can be executed using other representations of three-dimensional environments and/or other representations of objects in the three-dimensional environments. Such other representations can be used to identify object representations, and to determine whether those object representations reside wholly within a defined three-dimensional region, or whether those object representations reside outside of or straddle the defined three-dimensional region.

At 402, a processor-based system, for example the environment modeling computer system 124 (FIG. 1), 204 (FIG. 2) identifies one or more collections of contiguous ones of the voxels in a discretized representation of the three-dimensional operational environment 100, where the contiguous voxels all include respective occupancy values that represent the corresponding location in the three-dimensional operational environment 100 as being occupied as respective ones of one or more objects. For example, an algorithm called Connected Components may be executed by a processor to group together connected occupied voxels. Many other algorithms and/or sets of processor-executable instructions may be employed to identify sets of proximally adjacent voxels.

At 404, a processor-based system, for example the environment modeling computer system 124, 204, determines which, if any, of the one or more collections of contiguous ones of the voxels reside completely within a three-dimensional region of voxels in the discretized representation of the three-dimensional operational environment 100 that corresponds to the dilated model or oversized representation 131 (FIG. 1) of the robot.

At 406, for each voxel in the discretized representation of the three-dimensional operational environment 100 that corresponds to any of the one or more collections of contiguous ones of the voxels that reside completely within the three-dimensional region of voxels in the discretized representation of the operational environment that corresponds to the dilated model or oversized representation 131 of a current robot I (e.g., first robot 102*a*), a processor-based system, for example the environment modeling computer system 124, 204, sets the occupancy value of the respective voxel as representative of being unoccupied. In practice, any object representation that resides wholly inside a region that corresponds to the oversized or "dilated" representation 131 of a robot (e.g., first robot 102) may be indicated as being unoccupied, for example by changing an occupancy value or state of associated voxels from occupied to unoccupied. Any object representation that resides wholly outside the region or which straddles the region may be indicated as being occupied, for example by leaving an occupancy value or state of the associated voxels as occupied.

Figure 5:
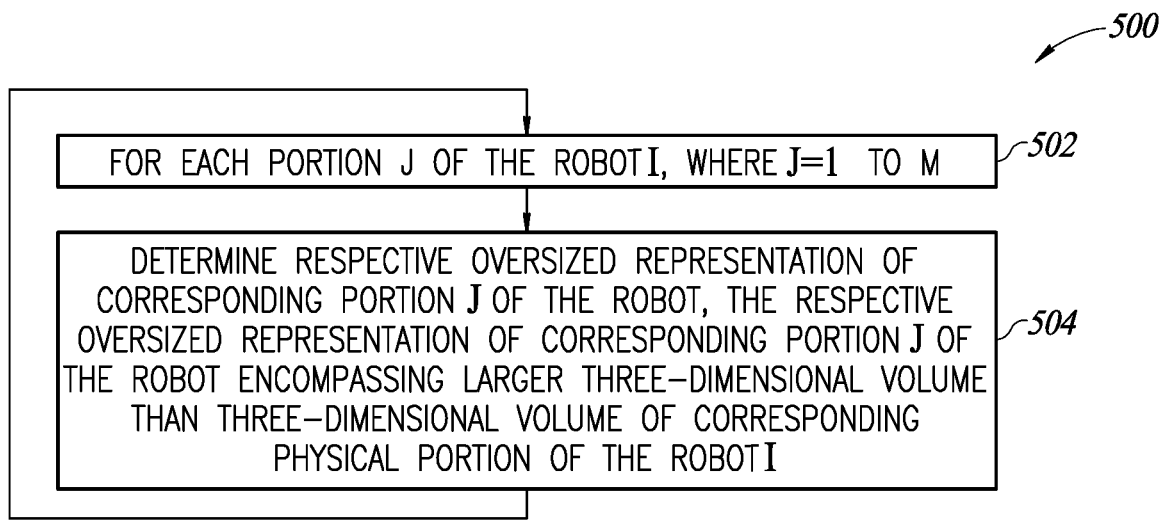
FIG. 5 is a flow diagram showing a low level method of operation of the environmental modeling system of FIG. 1, according to one illustrated implementation.

FIG. 5 shows a low level method 500 of operation of the environmental modeling system of FIG. 1, according to one illustrated implementation. The method 500 may be used to determine an oversized or "dilated" representation 131 of a robot 102. The method 500 may be executed as part of execution of the method 300.

The method 500 may enter an iterative loop 502, sequentially processing each portion J of a current robot I, where J=1 to M, and M is an integer that represents a total number of portions (e.g., links, joints) of the current robot I that will be modeled or assessed.

At 504, a processor-based system, for example the environment modeling computer system 124 (FIG. 1), 204 (FIG. 2), determines a respective oversized representation of corresponding portion J of a current robot I. The respective oversized representation of corresponding portion J of the current robot I encompasses a three-dimensional volume that is larger than a three-dimensional volume of the corresponding physical portion of the current robot I. For example, the processor-based system may modify a three-dimensional representation of the appendage 111 (FIG. 1) of a first robot (e.g., 102*a*) to increase at least one dimension thereof at least at one location thereon or therealong. Also for example, the processor-based system may modify a three-dimensional representation of the appendage 111 of the first robot (e.g., 102*a*) to increase at least one dimension thereof along at least one portion of the appendage 111 (e.g., the portion of the appendage 111 along which the at least one cable 119 (FIG. 1) extends along). The processor-based system may affirmatively or intentionally not increase any dimension in the three-dimensional representation of the appendage 111 of the first robot (e.g., 102*a*) for any of the portions of the appendage 111 along which at least one cable 119 does not extend along.

Figure 6:
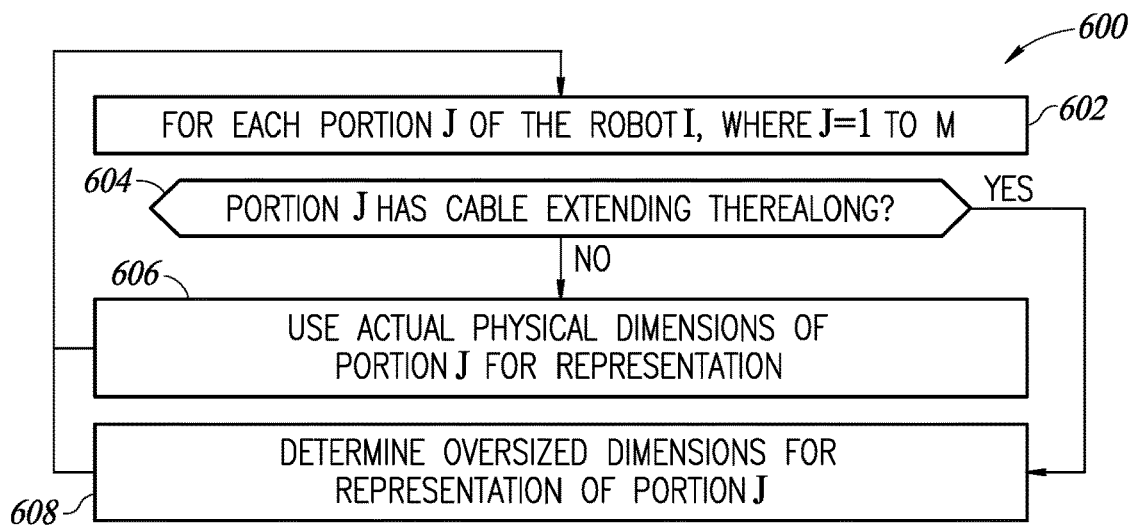
FIG. 6 is a flow diagram showing a low level method of operation of the environmental modeling system of FIG. 1, according to one illustrated implementation.

FIG. 6 shows a low level method 600 of operation of the environmental modeling system of FIG. 1, according to one illustrated implementation. The method 600 may be used to determine an oversized or "dilated" representation 131 (FIG. 1) of a robot 102 (FIG. 1). The method 600 may be executed as part of execution of the method 300 and/or method 500.

The method 600 may enter an iterative loop at 602, sequentially processing each portion J of a current robot I, where J=1 to M, and M is an integer that represents a total number of portions of the current robot I that will be modeled or assessed.

At 604, a processor-based system, for example the environment modeling computer system 124 (FIG. 1), 204 (FIG. 2) determines whether a given portion J of a current robot I (e.g., first robot 102*a*) has a cable extending therealong.

If the given portion J of the current robot I does not have a cable extending therealong, the environment modeling computer system 124, 204 at 606 uses the actual physical dimensions of the portion J of the current robot I for the representation.

If the given portion J of the current robot I does have a cable extending therealong, the environment modeling computer system 124, 204 at 608 determines an oversized representation of the portion J of the current robot I for use in the oversized representation. The oversized representation of the portion J of the current robot I has dimensions that encompass the actual physical dimensions of the portion J and that extend beyond the actual physical dimensions of the portion J at least at one location along the portion J of the current robot I. The dimensions of the oversized representation should be sufficiently large so as to encompass any attached structure (e.g., cables) that extends outwardly of the portion J of the current robot I.

Figure 7:
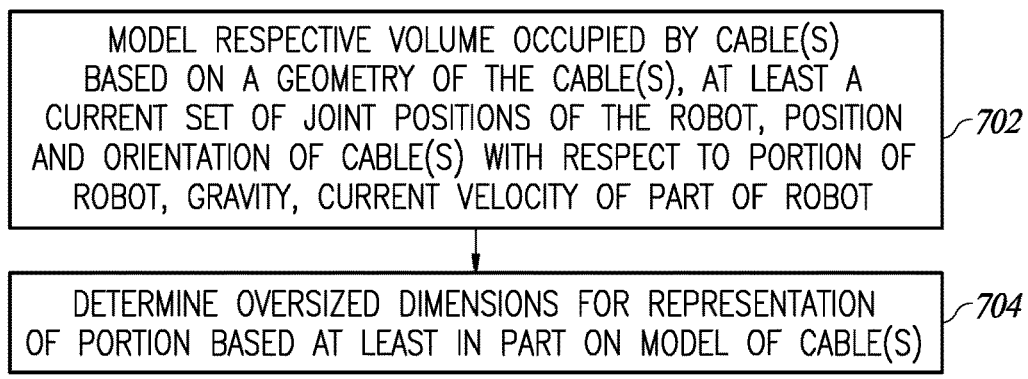
FIG. 7 is a flow diagram showing a low level method of operation of a processor-based system, according to one illustrated implementation.

FIG. 7 shows a low level method 700 of operation of a processor-based system, according to one illustrated implementation. The method 700 may be used to determine an oversized or "dilated" representation 131 (FIG. 1) of a robot 102 (FIG. 1). The method 700 may be executed during a configuration or pre-runtime process, or alternatively as part of execution of the method 300 and/or 500 during runtime.

A processor-based system models a respective volume occupied by one or more cables 119 (FIG. 1) based on one or more of a geometry of the cable(s) 119, a current set of joint positions of the current robot I (e.g., first robot 102), a position and orientation of the cable(s) 119 with respect to a portion of current robot I, an effect of gravity on the cable(s) 119, an amount of slack, sag, droop, or tension in the cable(s) 119, and/or a current velocity of at least a part of the portion of the current robot I or the cable(s) 119, for instance accounting for inertial effects on the cable(s) 119.

For example, a processor-based system may generate a three-dimensional representation of an oversized volume based at least in part on a location of the at least one cable 119 relative to at least a part of an appendage 111 of a current robot I with respect to gravity, particularly where the cable 119 may sag, droop, hang, or swing. For example, a processor-based system may generate a three-dimensional representation of an oversized volume based at least in part on an orientation of at least a part of an appendage 111 of a current robot I with respect to gravity. For example, a processor-based system may generate a three-dimensional representation of an oversized volume based at least in part on a current set of joint positions of a current robot I. For example, a processor-based system may generate a three-dimensional representation of an oversized volume that encompasses a base 110 (FIG. 1) of a current robot I, at least two links 112*a*, 112*b* (FIG. 1) of an appendage 111 of a current robot I, an end effector of a current robot I, and at least two cables 119 that are coupled to move with one or more of the appendages. For example, a processor-based system may generate a three-dimensional representation of an oversized volume based at least in part on a geometry of the at least one cable 119. For example, a processor-based system may generate a three-dimensional representation of an oversized volume based at least in part on a velocity of at least a part of the appendage 111 of the first robot 102 or a cable 119 attached thereto.

In some implementations, a processor-based system may generate a three-dimensional representation of an oversized volume in the form of a bounding box representation, based on a set of dimensions of the appendage of the first robot and based on a set of boarder buffer specifications that define an offset from an outer perimeter of the robot.

Figure 8:
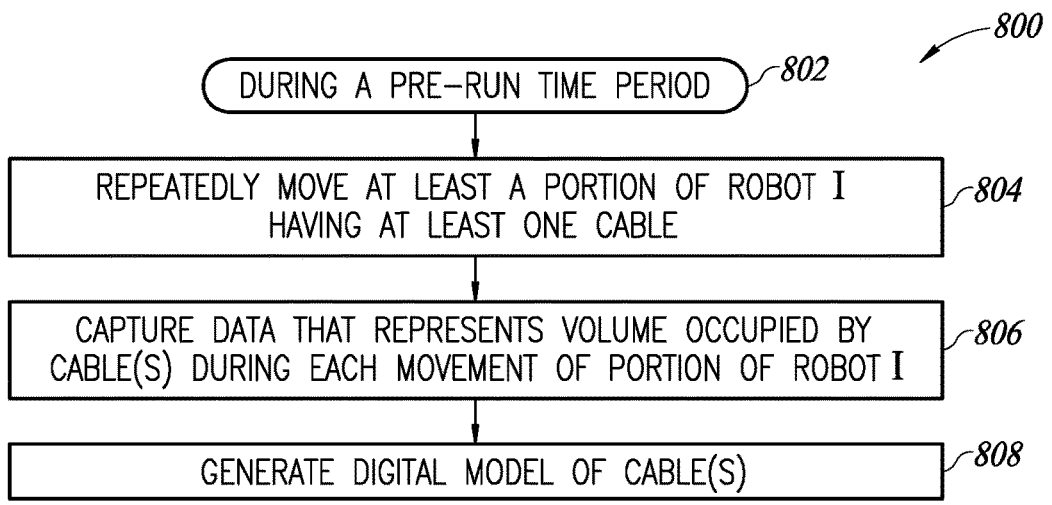
FIG. 8 is a flow diagram showing a low level method of operation of a processor-based system, according to one illustrated implementation.

FIG. 8 shows a low level method 800 of operation of the environmental modeling system of FIG. 1, according to one illustrated implementation. In some implementations, a processor-based system may model a cable to facilitate determination of an oversized representation of the robot or portion thereof. The method 800 may be executed during a configuration or pre-runtime process, or alternatively as part of execution of the method 300 and/or 500 during runtime.

At 802, during a pre-run time period a processor-based system performs a number of operations.

For example, the processor-based system repeatedly causes movement of at least a portion of a robot having at least one cable at 804.

Also for example, the processor-based system captures data from one or more sensors that represents a volume occupied by at least the one cable during each movement of the portion of the robot at 806.

Also for example, the processor-based system generates a digital model of at least the at least one cable at 808.

By modeling the cable(s) 119 (FIG. 1), a system may determine or generate a representation that specifies a precise zone around each segment of an appendage 111 (FIG. 1) of a robot 102 (FIG. 1). A very precise mechanical model may specify almost exactly where a cable 119 is, as a function of a geometry of the cable 119, a stiffness of the cable 119, attachment points at which the cable 119 is attached to the robot 102, a set of current joint positions of the robot 102, an amount of sag and/or tension in the cable 119, and/or a velocity or acceleration of the cable 119 and/or appendage 111. The cables 119 may be modeled using any variety of computer-aided techniques or representations (e.g., non-rational uniform b-splines (NRUBS)). This model could be learned (e.g., via a neural net or other machine-learning process) during a design-time training period in which the robotic operation is simulated, and a model that represents how the cables 119 behave is developed.

EXAMPLES

Example 1. A system, comprising:
at least one processor;
at least one nontransitory processor-readable medium communicatively coupled to the at least one processor and which stores processor-executable instructions which, when executed by the at least processor, cause the at least one processor to:
identify in a digital representation of a three-dimensional operational environment one or more elements that represent one or more physical objects that reside in the three-dimensional operational environment;
determine which, if any, of the physical objects represented in the digital representation of the three-dimensional operational environment reside completely within a three-dimensional representation of an oversized volume that encompasses at least an appendage of a first robot, at least one portion of the oversized volume which extends beyond a corresponding peripheral dimension of at least the appendage of the first robot to encompass one or more cables physically coupled to the appendage of the first robot; and
for any of the physical objects that are determined to reside completely within the three-dimensional representation of the oversized volume, set one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the first robot and the at least one cable is not indicated as being an obstacle.

Example 2. The system of claim 1 wherein the instructions, when executed by the at least one processor, cause the at least one processor further to:
perform motion planning for the first robot using the filtered representation of the three-dimensional operational environment.

Example 3. The system of Example 1 wherein the instructions, when executed by the at least one processor, cause the at least one processor further to:
generate the three-dimensional representation of the oversized volume that encompasses at least the appendage of the first robot and at least one portion of the oversized volume which extends beyond the corresponding peripheral dimension of the appendage of the first robot to encompass one or more cables physically coupled to the appendage of the first robot.

Example 4. The system of Example 3 wherein to generate the three-dimensional representation of an oversized volume, the instructions, when executed by the at least one processor, cause the at least one processor to:
modify a three-dimensional representation of the appendage of the first robot to increase at least one dimension thereof at least at one location thereon.

Example 5. The system of Example 3 wherein to generate the three-dimensional representation of an oversized volume, the instructions, when executed by the at least one processor, cause the at least one processor to:
modify a three-dimensional representation of the appendage of the first robot to increase at least one dimension thereof along a one portion of the appendage, the portion of the appendage along which the at least one cable extends along.

Example 6. The system of Example 5 wherein to generate the three-dimensional representation of an oversized volume, the instructions, when executed by the at least one processor, cause the at least one processor to:
not increase any dimension in the three-dimensional representation of the appendage of the first robot of any portions of the appendage along which the at least one cable does not extend along.

Example 7. The system of Example 3 wherein to generate the three-dimensional representation of an oversized volume, the instructions, when executed by the at least one processor, cause the at least one processor to:
generate the three-dimensional representation of an oversized volume based at least in part on a location of the at least one cable relative to at least a part of the appendage of the first robot with respect to gravity.

Example 8. The system of Example 3 wherein to generate the three-dimensional representation of an oversized volume, the instructions, when executed by the at least one processor, cause the at least one processor to:
generate the three-dimensional representation of an oversized volume based at least in part on an orientation of at least a part of the appendage of the first robot with respect to gravity and an amount of slack in at least one cable.

Example 9. The system of Example 3 wherein to generate the three-dimensional representation of an oversized volume, the instructions, when executed by the at least one processor, cause the at least one processor to:
generate a bounding box representation based on a set of dimensions of the appendage of the first robot and based on a set of boarder buffer specifications.

Example 10. The system of Example 3 wherein to generate the three-dimensional representation of an oversized volume, the instructions, when executed by the at least one processor, cause the at least one processor to:
generate the three-dimensional representation of an oversized volume based at least in part on a current set of joint positions of the first robot.

Example 11. The system of Example 3 wherein to generate the three-dimensional representation of an oversized volume, the instructions, when executed by the at least one processor, cause the at least one processor to:
generate the three-dimensional representation of an oversized volume that encompasses a base of the first robot, at least two appendages of the first robot, an end effector of the first robot, and at least two cables that are coupled to move with one or more of the appendages.

Example 12. The system of any of Examples 3 through 11 wherein to generate the three-dimensional representation of an oversized volume, the instructions, when executed by the at least one processor, cause the at least one processor to:
generate the three-dimensional representation of an oversized volume based at least in part on a geometry of the at least one cable.

Example 13. The system of Example 12 wherein to generate the three-dimensional representation of an oversized volume, the instructions, when executed by the at least one processor, cause the at least one processor to:
generate the three-dimensional representation of an oversized volume based at least in part on a velocity of at least a part of the appendage of the first robot.

Example 14. The system of Example 1, further comprising:
at least one sensor that in operation captures one or more physical characteristics of the three-dimensional operational environment.

Example 15. The system of Example 14 wherein the instructions, when executed by the at least one processor, cause the at least one processor further to:
generate the digital representation of the three-dimensional operational environment from the captured one or more physical characteristics of the three-dimensional operational environment sensed by the at least one sensor.

Example 16. The system of Example 14 wherein to generate the digital representation of the three-dimensional operational environment the instructions, when executed by the at least one processor, cause the at least one processor to:
generate at least one of a point cloud, a voxel grid, a surface map, a mesh, an occupancy grid, a k-ary tree, an Euclidean Distance Field representation, a hierarchical data structure or a non-hierarchical data structure.

Example 17. The system of Example 14 wherein to generate the digital representation of the three-dimensional operational environment the instructions, when executed by the at least one processor, cause the at least one processor to:
represent the three-dimensional operational environment as a plurality of voxels, where each voxel includes at least one respective occupancy value that represents an occupancy condition of the three-dimensional operational environment as at least one of occupied or unoccupied.

Example 18. The system of Example 1 wherein to identify in the digital representation of the three-dimensional operational environment one or more elements that represent one or more physical objects that reside in the three-dimensional operational environment the instructions, when executed by the at least one processor, cause the at least one processor to:
identify one or more groups of voxels in the digital representation of the three-dimensional operational environment that are contiguous and that each have a respective occupancy value that represents an occupied occupancy condition.

Example 19. The system of Example 18 wherein to determine which, if any, of the physical objects represented in the digital representation of the three-dimensional operational environment reside completely within a three-dimensional representation of an oversized volume the instructions, when executed by the at least one processor, cause the at least one processor to:
determine for each of the one or more groups of voxels in the digital representation of the three-dimensional operational environment that have been identified as representing a physical object whether the group of voxels straddles a boundary of the three-dimensional representation of the oversized volume.

Example 20. The system of Example 18 wherein to set one or more occupancy values in the digital representation of the three-dimensional operational environment to represent a volume corresponding to the respective physical object as unoccupied the instructions, when executed by the at least one processor, cause the at least one processor to:
for each voxel in the digital representation of the three-dimensional operational environment that corresponds to any of the objects that reside completely within the three-dimensional representation of the oversized volume as represented in the digital representation of the three-dimensional operational environment, set a respective occupancy value of the respective voxel as representative of being unoccupied.

Example 21. The system of Example 1 wherein, when executed by the at least one processor, the instructions cause the at least one processor to:
during a pre-run time period,
repeatedly move at least a portion of the first robot having at least one cable;
capture data that represents a volume occupied by at least the one cable during each movement of the portion of the first robot; and
generating a digital model of at least the at least one cable.

Example 22. The system of Example 1 wherein, when executed by the at least one processor, the instructions cause the at least one processor to:
determine which, if any, of the physical objects represented in the digital representation of the three-dimensional operational environment reside completely within a three-dimensional representation of an oversized volume that encompasses at least an appendage of a second robot, at least one portion of the oversized volume which extends beyond a corresponding peripheral dimension of at least the appendage of the second robot to encompass one or more cables physically coupled to the appendage of the second robot; and
for any of the physical objects that are determined to reside completely within the three-dimensional representation of the oversized volume, set one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the second robot and the at least one cable is not indicated as being an obstacle.

Example 23. A method of operation of a system, the system comprising at least one processor, and at least one nontransitory processor-readable medium communicatively coupled to the at least one processor and which stores processor-executable instructions, the method comprising:
identifying in a digital representation of a three-dimensional operational environment one or more elements that represent one or more physical objects that reside in the three-dimensional operational environment;

determining which, if any, of the physical objects represented in the digital representation of the three-dimensional operational environment reside completely within a three-dimensional representation of an oversized volume that encompasses at least an appendage of a first robot, at least one portion of the oversized volume which extends beyond a corresponding peripheral dimension of at least the appendage of the first robot to encompass one or more cables physically coupled to the appendage of the first robot; and for any of the physical objects that are determined to reside completely within the three-dimensional representation of the oversized volume, setting one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the first robot and the at least one cable is not indicated as being an obstacle.

Example 24. The method of Example 23, further comprising:

performing motion planning for the first robot using the filtered representation of the three-dimensional operational environment.

Example 25. The method of Example 23 further comprising:

generating the three-dimensional representation of the oversized volume that encompasses at least the appendage of the first robot and at least one portion of the oversized volume which extends beyond the corresponding peripheral dimension of the appendage of the first robot to encompass one or more cables physically coupled to the appendage of the first robot.

Example 26. The method of Example 25 wherein generating the three-dimensional representation of an oversized volume includes:

modifying a three-dimensional representation of the appendage of the first robot to increase at least one dimension thereof at least at one location thereon.

Example 27. The method of Example 25 wherein generating the three-dimensional representation of an oversized volume includes:

modifying a three-dimensional representation of the appendage of the first robot to increase at least one dimension thereof along a one portion of the appendage, the portion of the appendage along which the at least one cable extends along.

Example 28. The method of Example 27 wherein generating the three-dimensional representation of an oversized volume includes:

not increasing any dimension in the three-dimensional representation of the appendage of the first robot of any portions of the appendage along which the at least one cable does not extend along.

Example 29. The method of Example 25 wherein generating the three-dimensional representation of an oversized volume includes:

generating the three-dimensional representation of an oversized volume based at least in part on a location of the at least one cable relative to at least a part of the appendage of the first robot with respect to gravity.

Example 30. The method of Example 25 wherein generating the three-dimensional representation of an oversized volume includes:

generating the three-dimensional representation of an oversized volume based at least in part on an orientation of at least a part of the appendage of the first robot with respect to gravity and an amount of slack in at least one cable.

Example 31. The method of Example 25 wherein generating the three-dimensional representation of an oversized volume includes:

generating a bounding box representation based on a set of dimensions of the appendage of the first robot and based on a set of boarder buffer specifications.

Example 32. The method of Example 25 wherein generating the three-dimensional representation of an oversized volume includes:

generating the three-dimensional representation of an oversized volume based at least in part on a current set of joint positions of the first robot.

Example 33. The method of Example 25 wherein generating the three-dimensional representation of an oversized volume includes:

generating the three-dimensional representation of an oversized volume that encompasses a base of the first robot, at least two appendages of the first robot, an end effector of the first robot, and at least two cables that are coupled to move with one or more of the appendages.

Example 34. The method of any of Examples 25 through 33 wherein generating the three-dimensional representation of an oversized volume includes:

generating the three-dimensional representation of an oversized volume based at least in part on a geometry of the at least one cable.

Example 35. The method of Example 34 wherein generating the three-dimensional representation of an oversized volume includes:

generating the three-dimensional representation of an oversized volume based at least in part on a velocity of at least a part of the appendage of the first robot.

Example 36. The method of Example 23, further comprising:

capturing one or more physical characteristics of the three-dimensional operational environment via at least one sensor.

Example 37. The method of Example 36, further comprising:

generating the digital representation of the three-dimensional operational environment from the captured one or more physical characteristics of the three-dimensional operational environment sensed by the at least one sensor.

Example 38. The method of Example 36 wherein generating the digital representation of the three-dimensional operational environment includes:

generating at least one of a point cloud, a voxel grid, a surface map, a mesh, an occupancy grid, a k-ary tree, an Euclidean Distance Field representation, a hierarchical data structure or a non-hierarchical data structure.

Example 39. The method of Example 36 wherein generating the digital representation of the three-dimensional operational environment includes:

representing the three-dimensional operational environment as a plurality of voxels, where each voxel includes at least one respective occupancy value that represents an occupancy condition of the three-dimensional operational environment as at least one of occupied or unoccupied.

Example 40. The method of Example 23 wherein identifying in the digital representation of the three-dimensional operational environment one or more elements that represent one or more physical objects that reside in the three-dimensional operational environment includes:
identifying one or more groups of voxels in the digital representation of the three-dimensional operational environment that are contiguous and that each have a respective occupancy value that represents an occupied occupancy condition.

Example 41. The method of Example 40 wherein determining which, if any, of the physical objects represented in the digital representation of the three-dimensional operational environment reside completely within a three-dimensional representation of an oversized volume includes:
determining for each of the one or more groups of voxels in the digital representation of the three-dimensional operational environment that have been identified as representing a physical object whether the group of voxels straddle a boundary of the three-dimensional representation of the oversized volume.

Example 42. The method of Example 40 wherein setting one or more occupancy values in the digital representation of the three-dimensional operational environment to represent a volume corresponding to the respective physical object as unoccupied includes:
for each voxel in the digital representation of the three-dimensional operational environment that corresponds to any of the objects that reside completely within the three-dimensional representation of the oversized volume as represented in the digital representation of the three-dimensional operational environment, setting a respective occupancy value of the respective voxel as representative of being unoccupied.

Example 43. The method of Example 23, further comprising:
during a pre-run time period,
repeatedly causing at least a portion of the first robot having at least one cable to move;
capturing data that represents a volume occupied by at least the one cable during each movement of the portion of the first robot; and
generating a digital model of at least the at least one cable.

Example 44. The method of Example 23, further comprising:
determining which, if any, of the physical objects represented in the digital representation of the three-dimensional operational environment reside completely within a three-dimensional representation of an oversized volume that encompasses at least an appendage of a second robot, at least one portion of the oversized volume which extends beyond a corresponding peripheral dimension of at least the appendage of the second robot to encompass one or more cables physically coupled to the appendage of the second robot; and
for any of the physical objects that are determined to reside completely within the three-dimensional representation of the oversized volume, setting one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the second robot and the at least one cable is not indicated as being an obstacle.

Example 45. A system, comprising:
at least one processor;
at least one nontransitory processor-readable medium communicatively coupled to the at least one processor and which stores processor-executable instructions which, when executed by the at least processor, cause the at least one processor to:
identify in a digital representation of a three-dimensional operational environment one or more elements that represent one or more physical objects that reside in the three-dimensional operational environment;
determine which, if any, of the physical objects represented in the digital representation of the three-dimensional operational environment reside completely within a three-dimensional representation of an oversized volume that encompasses at least an appendage of a first robot, at least one portion of the oversized volume which extends beyond a corresponding peripheral dimension of at least the appendage of the first robot to encompass one or more structures physically coupled to the appendage of the first robot; and
for any of the physical objects that are determined to reside completely within the three-dimensional representation of the oversized volume, set one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the first robot and the at least one structure is not indicated as being an obstacle.

Example 46. The system of Example 45 wherein the one or more structures is a cable.

Example 47. The system of Example 45 wherein the one or more structures is a sensor or a cable attachment.

CONCLUSION

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

While often described in terms of voxel space and voxels, various other forms may be employed to represent the robots, the obstacles and the target objects. For example, various geometries can be efficiently represented with, for example, any of octrees, sets of boxes, or Euclidean distance fields (EDFs).

An octree is a hierarchical data structure to store voxel occupancy data. A tree structure allows collision detection to descend only as far into an inherent hierarchy of the tree's structure as needed, increasing computational efficiency of a collision detection process. One benefit of an octree is the inherent hierarchy. There are of course other data structures that are hierarchical and which may be suitable.

Sets of boxes may take a variety of forms, for example: a tree of axis-aligned bounding boxes (AABBs), a tree of oriented (not axis-aligned) bounding boxes, or a tree of spheres. Notably, the leaves of any of these tree type data structures can be a different shape than the other nodes of the data structure, e.g., all nodes are AABBs except the root nodes which may take the form of triangle meshes. The selection of a bounding volume representation comes with a tradeoff between the latency required to build the corresponding data structure and a latency of computing collisions, for example including how much of a tree needs to be traversed before the collision detection is complete. For example, using spheres as bounding volumes facilitates fast comparisons (i.e., it is computationally easy to determine if spheres overlap each other). For instance, as discussed elsewhere herein, it may be preferable to use a k-ary sphere tree to represent each link of a robot. In some implementations, the voxels in representing the environment can be grouped together into a set of AABBs. This could simplify the voxel data sufficiently that it would be computationally faster and more memory efficient than employing octrees in some circumstances.

A EDF discretizes a workspace into a 3D grid of voxels, and the value of each voxel encodes a distance to a nearest obstacle in that workspace. The workspace encompasses all of the space that a robot might possibly reach in any pose of the robot.

A robot can be modeled as a tree of links connected by joints. For a single robot appendage or arm, this "tree" is often unary, but can be more general, e.g., with a link that has two or more child links.

For obstacles that will occupy a consistent or unchanging volume in an environment throughout a run time and where that occupied volume is known at a configuration time, it may be preferable to represent those persistent obstacles with a Euclidean distance field.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. Patent Application No. 62/626,939, filed Feb. 6, 2018, entitled "MOTION PLANNING OF A ROBOT STORING A DISCRETIZED ENVIRONMENT ON ONE OR MORE PROCESSORS AND IMPROVED OPERATION OF SAME"; U.S. Patent Application No. 62/722,067, filed Aug. 23, 2018, entitled "COLLISION DETECTION USEFUL IN MOTION PLANNING FOR ROBOTICS"; International Patent Application No. PCT/US2019/045270, filed Aug. 6, 2019, entitled "COLLISION DETECTION USEFUL IN MOTION PLANNING FOR ROBOTICS"; U.S. Patent Application No. 62/964,405, filed Jan. 22, 2020, entitled "CONFIGURATION OF ROBOTS IN MULTI-ROBOT OPERATIONAL ENVIRONMENT"; and U.S. Patent Application No. 62/991,487, filed Mar. 18, 2020, entitled "DIGITAL REPRESENTATIONS OF ROBOT OPERATIONAL ENVIRONMENT, USEFUL IN MOTION PLANNING FOR ROBOTS" are incorporated herein by reference, in their entirety. These and other changes can be made to the embodiments in light of the above-detailed description.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
at least one processor; at least one nontransitory processor-readable medium communicatively coupled to the at least one processor and which stores processor-executable instructions which, when executed by the at least processor, cause the at least one processor to:
identify one or more elements in a digital representation of a three-dimensional operational environment, the one or more elements that represent one or more physical objects that reside in the three-dimensional operational environment;
determine which, whether any, of the physical objects represented in the digital representation of the three-dimensional operational environment reside completely within a three-dimensional representation of an oversized volume that encompasses at least an appendage of a first robot, at least one portion of the oversized volume which extends beyond a corresponding peripheral dimension of at least the appendage of the first robot to encompass one or more cables physically coupled to the appendage of the first robot;
for at least one of the physical objects that are-is determined to reside completely within the three-dimensional representation of the oversized volume, set one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the first robot and at least one of the one or more cables is not indicated as being an obstacle;

perform motion planning for the first robot using the filtered representation of the three-dimensional operational environment; and provide an output to position and orient robots in a multi-robot environment and that causes the robot to perform tasks.

2. The system of claim 1 wherein the instructions, when executed by the at least one processor, cause the at least one processor further to:

generate the three-dimensional representation of the oversized volume that encompasses at least the appendage of the first robot and the at least one portion of the oversized volume which extends beyond the corresponding peripheral dimension of the appendage of the first robot to encompass one or more cables physically coupled to the appendage of the first robot.

3. The system of claim 2 wherein to generate the three-dimensional representation of an oversized volume, the instructions, when executed by the at least one processor, cause the at least one processor to:

modify a three-dimensional representation of the appendage of the first robot to increase at least one dimension thereof along a one portion of the appendage, the portion of the appendage along which the at least one of the one or more cables extends along.

4. The system of claim 2 wherein to generate the three-dimensional representation of an oversized volume, the instructions, when executed by the at least one processor, cause the at least one processor to:

generate the three-dimensional representation of an oversized volume based at least on a location of the at least one of the one or more cables relative to at least a part of the appendage of the first robot with respect to gravity.

5. The system of claim 2 wherein to generate the three-dimensional representation of an oversized volume, the instructions, when executed by the at least one processor, cause the at least one processor to:

generate the three-dimensional representation of an oversized volume based at least on an orientation of at least a part of the appendage of the first robot with respect to gravity and an amount of slack in at least one of the one or more cables.

6. The system of claim 2 wherein to generate the three-dimensional representation of an oversized volume, the instructions, when executed by the at least one processor, cause the at least one processor to:

generate a bounding box representation based on a set of dimensions of the appendage of the first robot and based on a set of border buffer specifications.

7. The system of claim 2 wherein to generate the three-dimensional representation of an oversized volume, the instructions, when executed by the at least one processor, cause the at least one processor to:

generate the three-dimensional representation of an oversized volume based at least on a geometry of the at least one of the one or more cables.

8. The system of claim 7 wherein to generate the three-dimensional representation of an oversized volume, the instructions, when executed by the at least one processor, cause the at least one processor to:

generate the three-dimensional representation of an oversized volume based at least on a velocity of at least a part of the appendage of the first robot.

9. The system of claim 1 wherein to identify one or more elements in the digital representation of the three-dimensional operational environment, the instructions, when executed by the at least one processor, cause the at least one processor to:

identify one or more groups of voxels in the digital representation of the three-dimensional operational environment that are contiguous and that each have a respective occupancy value that represents an occupied occupancy condition, and wherein to determine which, if any, of the physical objects represented in the digital representation of the three-dimensional operational environment reside completely within a three-dimensional representation of an oversized volume the instructions, when executed by the at least one processor, cause the at least one processor to:

determine for each of the one or more groups of voxels in the digital representation of the three-dimensional operational environment that have been identified as representing a physical object whether the group of voxels straddle a boundary of the three-dimensional representation of the oversized volume.

10. The system of claim 1 wherein to identify one or more elements in the digital representation of the three-dimensional operational environment, the instructions, when executed by the at least one processor, cause the at least one processor to:

identify one or more groups of voxels in the digital representation of the three-dimensional operational environment that are contiguous and that each have a respective occupancy value that represents an occupied occupancy condition, and wherein to set one or more occupancy values in the digital representation of the three-dimensional operational environment to represent a volume corresponding to the respective physical object as unoccupied the instructions, when executed by the at least one processor, cause the at least one processor to:

for each voxel in the digital representation of the three-dimensional operational environment that corresponds to any of the objects that reside completely within the three-dimensional representation of the oversized volume as represented in the digital representation of the three-dimensional operational environment, set a respective occupancy value of the respective voxel as representative of being unoccupied.

11. The system of claim 1 wherein, when executed by the at least one processor, the instructions cause the at least one processor to:

during a pre-run time period,
repeatedly move at least a portion of the first robot having the at least one of the one or more cables;
capture data that represents a volume occupied by the at least one of the one or more cables during each movement of the portion of the first robot; and
generating a digital model of at least the at least one of the one or more cables.

12. The system of claim 1 wherein, when executed by the at least one processor, the instructions cause the at least one processor to:

determine which, if any, of the physical objects represented in the digital representation of the three-dimensional operational environment reside completely within a three-dimensional representation of an oversized volume that encompasses at least an appendage of a second robot, at least one portion of the oversized volume which extends beyond a corresponding peripheral dimension of at least the appendage of the second robot to encompass one or more cables physically coupled to the appendage of the second robot; and for any of the physical objects that are determined to reside completely within the three-dimensional representation of the oversized volume, set one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the second robot and the at least one of the one or more cables is not indicated as being an obstacle.

13. A method of operation of a system, the system comprising at least one processor, and at least one nontransitory processor-readable medium communicatively coupled to the at least one processor and which stores processor-executable instructions, the method comprising:

identifying one or more elements in a digital representation of a three-dimensional operational environment, the one or more elements which represent one or more physical objects that reside in the three-dimensional operational environment;

determining whether any, of the physical objects represented in the digital representation of the three-dimensional operational environment reside completely within a three-dimensional representation of an oversized volume that encompasses at least an appendage of a first robot, at least one portion of the oversized volume which extends beyond a corresponding peripheral dimension of at least the appendage of the first robot to encompass one or more cables physically coupled to the appendage of the first robot;

for at least one of the physical objects that a-is determined to reside completely within the three-dimensional representation of the oversized volume, setting one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the first robot and the-at least one of the one or more cables is not indicated as being an obstacle;

performing motion planning for the first robot using the filtered representation of the three-dimensional operational environment; and providing output to position and orient robots in a multi-robot environment and that causes the robot to perform tasks.

14. The method of claim 13 further comprising:

generating the three-dimensional representation of the oversized volume that encompasses at least the appendage of the first robot and at least one portion of the oversized volume which extends beyond the corresponding peripheral dimension of the appendage of the first robot to encompass one or more cables physically coupled to the appendage of the first robot.

15. The method of claim 14 wherein generating the three-dimensional representation of an oversized volume includes:

modifying a three-dimensional representation of the appendage of the first robot to increase at least one dimension thereof along a one portion of the appendage, the portion of the appendage along which the at least one of the one or more cables extends along.

16. The method of claim 14 wherein generating the three-dimensional representation of an oversized volume includes:

generating the three-dimensional representation of an oversized volume based at least on a location of the at least one of the one or more cables relative to at least a part of the appendage of the first robot with respect to gravity.

17. The method of claim 14 wherein generating the three-dimensional representation of an oversized volume includes:

generating the three-dimensional representation of an oversized volume based at least on an orientation of at least a part of the appendage of the first robot with respect to gravity and an amount of slack in the at least one of the one or more cables.

18. The method of claim 14 wherein generating the three-dimensional representation of an oversized volume includes:

generating a bounding box representation based on a set of dimensions of the appendage of the first robot and based on a set of border buffer specifications.

19. The method of claim 14 wherein generating the three-dimensional representation of an oversized volume includes:

generating the three-dimensional representation of an oversized volume based at least on a geometry of the at least one of the one or more cables.

20. The method of claim 19 wherein generating the three-dimensional representation of an oversized volume includes:

generating the three-dimensional representation of an oversized volume based at least on a velocity of at least a part of the appendage of the first robot.

21. The method of claim 13 wherein identifying one or more elements in the digital representation of the three-dimensional operational environment includes:

identifying one or more groups of voxels in the digital representation of the three-dimensional operational environment that are contiguous and that each have a respective occupancy value that represents an occupied occupancy condition, and wherein determining which, if any, of the physical objects represented in the digital representation of the three-dimensional operational environment reside completely within a three-dimensional representation of an oversized volume includes:

determining for each of the one or more groups of voxels in the digital representation of the three-dimensional operational environment that have been identified as representing a physical object whether the group of voxels straddle a boundary of the three-dimensional representation of the oversized volume.

22. The method of claim 13 wherein identifying one or more elements in the digital representation of the three-dimensional operational environment includes:

identifying one or more groups of voxels in the digital representation of the three-dimensional operational environment that are contiguous and that each have a respective occupancy value that represents an occupied occupancy condition, and wherein setting one or more occupancy values in the digital representation of the three-dimensional operational environment to represent a volume corresponding to the respective physical object as unoccupied includes:

for each voxel in the digital representation of the three-dimensional operational environment that corresponds to any of the objects that reside completely within the three-dimensional representation of the oversized volume as represented in the digital representation of the three-dimensional operational environment, setting a respective occupancy value of the respective voxel as representative of being unoccupied.

23. The method of claim 13, further comprising:
during a pre-run time period,
repeatedly causing at least a portion of the first robot having the at least one of the one or more cables to move;
capturing data that represents a volume occupied by the at least one of the one or more cables during each movement of the portion of the first robot; and
generating a digital model of at least the at least one of the one or more cables.

24. The method of claim 13, further comprising:
determining which, if any, of the physical objects represented in the digital representation of the three-dimensional operational environment reside completely within a three-dimensional representation of an oversized volume that encompasses at least an appendage of a second robot, at least one portion of the oversized volume which extends beyond a corresponding peripheral dimension of at least the appendage of the second robot to encompass one or more cables physically coupled to the appendage of the second robot; and
for any of the physical objects that are determined to reside completely within the three-dimensional representation of the oversized volume, setting one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the second robot and the at least one of the one or more cables is not indicated as being an obstacle.

25. A system, comprising:
at least one processor;
at least one nontransitory processor-readable medium communicatively coupled to the at least one processor and which stores processor-executable instructions which, when executed by the at least processor, cause the at least one processor to:
identify one or more elements in a digital representation of a three-dimensional operational environment, the one or more elements which represent one or more physical objects that reside in the three-dimensional operational environment;
determine whether any, of the physical objects represented in the digital representation of the three-dimensional operational environment reside completely within a three-dimensional representation of an oversized volume that encompasses at least an appendage of a first robot, at least one portion of the oversized volume which extends beyond a corresponding peripheral dimension of at least the appendage of the first robot to encompass one or more structures physically coupled to the appendage of the first robot; and
for at least one of the physical objects that is determined to reside completely within the three-dimensional representation of the oversized volume, set one or more occupancy values in the digital representation of the three-dimensional operational environment to represent a volume corresponding to the respective physical object as unoccupied to provide a filtered representation of the three-dimensional operational environment in which the oversized volume encompassing at least the robotic appendage of the first robot and the at least one structure is not indicated as being an obstacle.

26. The system of claim 25 wherein the one or more structures is a cable.

* * * * *